US012070947B2

(12) United States Patent
Gejima

(10) Patent No.: US 12,070,947 B2
(45) Date of Patent: Aug. 27, 2024

(54) LIQUID DISCHARGE HEAD AND RECORDING APPARATUS

(71) Applicant: KYOCERA CORPORATION, Kyoto (JP)

(72) Inventor: Kenko Gejima, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 296 days.

(21) Appl. No.: 17/598,842

(22) PCT Filed: Mar. 17, 2020

(86) PCT No.: PCT/JP2020/011850
§ 371 (c)(1),
(2) Date: Sep. 27, 2021

(87) PCT Pub. No.: WO2020/196121
PCT Pub. Date: Oct. 1, 2020

(65) Prior Publication Data

US 2022/0176706 A1 Jun. 9, 2022

(30) Foreign Application Priority Data

Mar. 28, 2019 (JP) ................................ 2019-064768

(51) Int. Cl.
*B41J 2/14* (2006.01)
*B41J 2/175* (2006.01)
*B41J 2/19* (2006.01)

(52) U.S. Cl.
CPC ....... *B41J 2/14209* (2013.01); *B41J 2/17523* (2013.01); *B41J 2/17563* (2013.01); *B41J 2002/14225* (2013.01); *B41J 2002/14306* (2013.01); *B41J 2002/14419* (2013.01); *B41J 2/19* (2013.01)

(58) Field of Classification Search
CPC ........................ B41J 2/14209; B41J 2/17523; B41J 2/17563; B41J 2002/14225; B41J 2002/14306; B41J 2002/14419; B41J 2/19
See application file for complete search history.

(56) References Cited

U.S. PATENT DOCUMENTS

| | | | | |
|---|---|---|---|---|
| 7,571,990 | B2 | 8/2009 | Taira et al. | |
| 9,346,269 | B2 * | 5/2016 | Akahane | B41J 2/1433 |
| 10,723,142 | B2 * | 7/2020 | Saito | B41J 11/0015 |

FOREIGN PATENT DOCUMENTS

| | | | |
|---|---|---|---|
| JP | 4432925 | B2 | 3/2010 |
| JP | 2017211151 | A | 11/2017 |
| JP | 201894809 | A | 6/2018 |
| JP | 2018202611 | A | 12/2018 |

* cited by examiner

*Primary Examiner* — Geoffrey S Mruk
(74) *Attorney, Agent, or Firm* — HAUPTMAN HAM, LLP

(57) ABSTRACT

A liquid discharge head according to an embodiment includes: a flow channel member including a first surface and a second surface located opposite to the first surface, a pressing unit located on the first surface, and a supply member connected to the flow channel member. The flow channel member includes a plurality of discharge holes located in the second surface. The supply member includes, in this order from an upstream side, a first supply flow channel, a first connection flow channel connected to the first supply flow channel, and a reservoir connected to the first connection flow channel, the first connection flow channel being connected to the second surface side of the reservoir.

18 Claims, 20 Drawing Sheets

LIQUID DISCHARGE HEAD AND RECORDING APPARATUS

RELATED APPLICATIONS

The present application is a National Phase of International Application Number PCT/JP2020/011850 filed Mar. 17, 2020, and claims priority based on Japanese Patent Application No. 2019-064768 filed Mar. 28, 2019.

TECHNICAL FIELD

The disclosed embodiments relate to a liquid discharge head and a recording apparatus.

BACKGROUND ART

Known printing apparatuses include inkjet printers and inkjet plotters that utilize an inkjet recording method. An inkjet printing apparatus is installed with a liquid discharge head for discharging a liquid.

The liquid discharge head includes a flow channel member having a plurality of discharge holes, and a supply member connected to the flow channel member. Of these, the supply member includes a supply flow channel and a reservoir that stores liquid from the supply flow channel, and has a flow channel configuration for supplying the liquid to the reservoir from a direction intersecting with a direction in which gravity acts (see, for example, Patent Literature 1).

CITATION LIST

Patent Literature

Patent Literature 1: Japanese Patent No. 4432925

SUMMARY OF INVENTION

Technical Problem

Unfortunately, in the known liquid discharge head as described above, when bubbles are mixed in the supply flow channel, the bubbles may remain in the supply flow channel due to a difference in the direction of buoyancy acting on the bubbles and the direction in which the liquid is supplied to the reservoir. The bubbles remaining in the supply flow channel may hinder the flow of liquid, resulting in insufficient supply of liquid to the reservoir.

An aspect of an embodiment of the present invention has been made in view of the above, and an object of the present invention is to provide a liquid discharge head and a recording apparatus capable of preventing insufficient supply of liquid to a reservoir.

Solution to Problem

A liquid discharge head according to an aspect of the present invention includes: a flow channel member including a first surface and a second surface located opposite to the first surface; a pressing unit located on the first surface; and a supply member connected to the flow channel member. The flow channel member includes a plurality of discharge holes located in the second surface. The supply member includes, in this order from an upstream side, a first supply flow channel; a first connection flow channel connected to the first supply flow channel; and a reservoir connected to the first connection flow channel. The first connection flow channel is connected to the second surface side of the reservoir.

A recording apparatus according to an aspect of the present invention includes: a flow channel member including a first surface and a second surface located opposite to the first surface; a pressing unit located on the first surface; and a supply member connected to the flow channel member. The flow channel member includes a plurality of discharge holes located in the second surface. The supply member includes, in this order from an upstream side, a first supply flow channel; a first connection flow channel connected to the first supply flow channel; and a reservoir connected to the first connection flow channel. The first connection flow channel includes: a liquid discharge head connected to the second surface side of the reservoir; a conveying unit configured to convey a recording medium to the liquid discharge head; and a control unit configured to control the liquid discharge head.

Advantageous Effects of Invention

According to one aspect of an embodiment of the present invention, insufficient supply of liquid to the reservoir can be prevented.

DESCRIPTION OF EMBODIMENTS

Embodiments of a liquid discharge head and a recording apparatus disclosed in the present application will be described in detail below with reference to the accompanying drawings. Note that the present invention is not limited by the embodiments described below.

Printer Configuration

Figure 1:
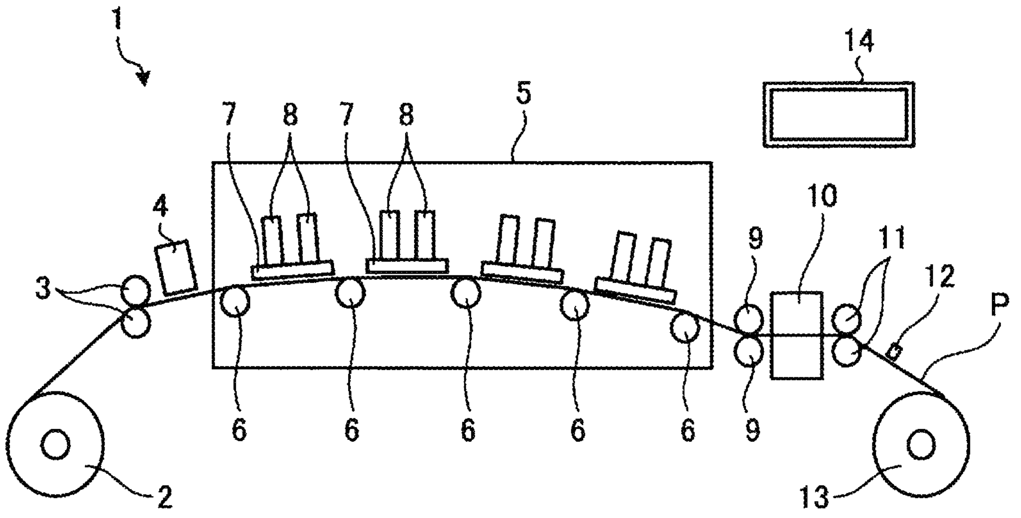
FIG. 1 is an explanatory view (1) of a recording apparatus according to an embodiment.
Figure 2:
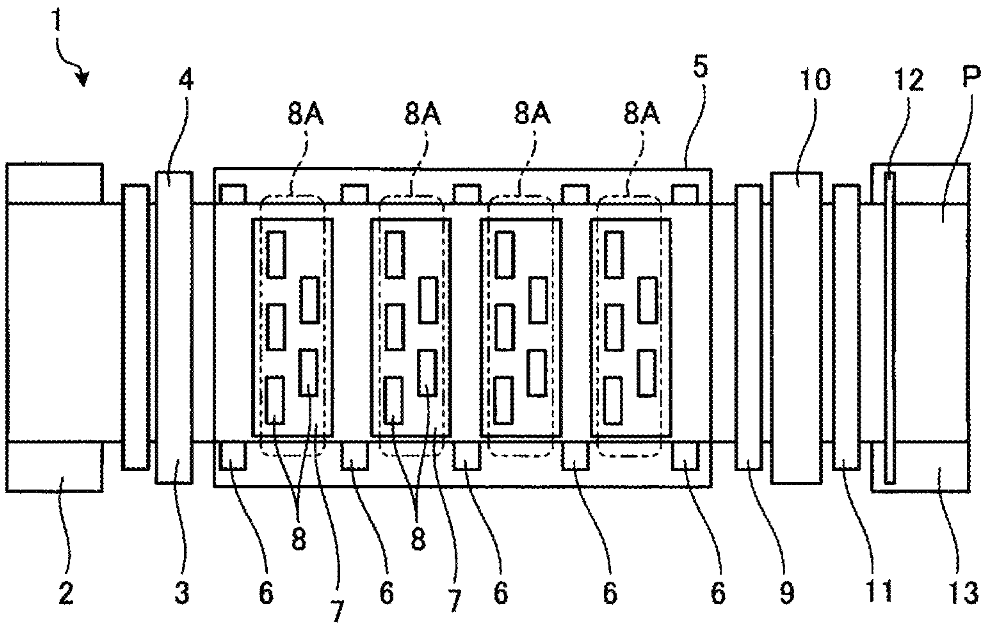
FIG. 2 is an explanatory view (2) of the recording apparatus according to the embodiment.

First, with reference to FIG. 1 and FIG. 2, a description will be given of an overview of a printer 1 serving as an example of a recording apparatus according to an embodiment. FIGS. 1 and 2 are explanatory views of the printer 1 according to the embodiment. Specifically, FIG. 1 is a schematic side view of the printer 1 and FIG. 2 is a schematic plan view of the printer 1. The printer 1 according to the embodiment is, for example, a color inkjet printer.

As illustrated in FIG. 1, the printer 1 includes a paper feed roller 2, guide rollers 3, an applicator 4, a head case 5, a plurality of conveying rollers 6, a plurality of frames 7, a plurality of liquid discharge heads 8, conveying rollers 9, a dryer 10, conveying rollers 11, a sensor unit 12, and a collection roller 13. The conveying rollers 6 are examples of a conveying unit.

The printer 1 includes a control unit 14 that controls the paper feed roller 2, the guide rollers 3, the applicator 4, the head case 5, the plurality of conveying rollers 6, the plurality of frames 7, the plurality of liquid discharge heads 8, the conveying rollers 9, the dryer 10, the conveying rollers 11, the sensor unit 12, and the collection roller 13.

The printer 1 records an image and characters on a printing sheet P by causing droplets to land on the printing sheet P. The printing sheet P is an example of a recording medium. The printing sheet P is rolled on the paper feed roller 2 prior to use. In this state, the printer 1 conveys the printing sheet P from the paper feed roller 2 to the inside of the head case 5 via the guide rollers 3 and the applicator 4.

The applicator 4 uniformly applies a coating agent over the printing sheet P. With surface treatment thus performed on the printing sheet P, the printing quality of the printer 1 can be improved.

The head case 5 houses the plurality of conveying rollers 6, the plurality of frames 7, and the plurality of liquid discharge heads 8. The inside of the head case 5 is formed with a space separated from the outside except for a part connected to the outside such as parts where the printing sheet P enters and exits.

If necessary, the control unit 14 controls at least one of controllable factors of the internal space of the head case 5, such as the temperature, the humidity, and barometric pressure. The conveying rollers 6 convey the printing sheet P to the vicinity of the liquid discharge heads 8, inside the head case 5.

The frame 7 is a rectangular flat plate, and is positioned above and close to the printing sheet P conveyed by the conveying rollers 6. As illustrated in FIG. 2, the frames 7 are positioned such that the longitudinal direction of the frames 7 is orthogonal to the conveyance direction of the printing sheet P. Furthermore, the plurality of (e.g., four) frames 7 are located inside the head case 5 along the conveyance direction of the printing sheet P.

Liquid, which is ink for example, is supplied to the liquid discharge heads 8 from a liquid tank (not illustrated). The liquid discharge heads 8 discharge the liquid supplied from the liquid tank.

The control unit 14 controls the liquid discharge heads 8 based on data of an image, characters, and the like to discharge the liquid toward the printing sheet P. The distance between each liquid discharge head 8 and the printing sheet P is, for example, approximately 0.5 mm to 20 mm.

The liquid discharge heads 8 are fixed to the frame 7. The liquid discharge heads 8 are positioned such that the longitudinal direction of the liquid discharge heads 8 is orthogonal to the conveyance direction of the printing sheet P.

That is, the printer 1 according to the embodiment is what is known as a line printer with the liquid discharge heads 8 fixed inside the printer 1. Note that the printer 1 according to the embodiment is not limited to a line printer and may also be what is known as a serial printer.

The serial printer is a printer employing a method of alternately performing operations of recording while moving the liquid discharge heads 8 in a manner such as reciprocation in a direction intersecting (e.g., substantially orthogonal to) the conveyance direction of the printing sheet P, and conveying the printing sheet P.

As illustrated in FIG. 2, a plurality of (e.g., five) liquid discharge heads 8 are fixed to one frame 7. FIG. 2 illustrates an example in which three liquid discharge heads 8 are located on the forward side and two liquid discharge heads 8 are located on the rear side, in the conveyance direction of the printing sheet P. Further, the liquid discharge heads 8 are positioned without their centers overlapping in the conveyance direction of the printing sheet.

The plurality of liquid discharge heads 8 positioned in one frame 7 form a head group 8A. Four head groups 8A are positioned along the conveyance direction of the printing sheet P. The liquid discharge heads 8 belonging to the same head group 8A are supplied with ink of the same color. As a result, the printer 1 can perform printing with four colors of ink using the four head groups 8A.

The colors of the ink discharged from the respective head groups 8A are, for example, magenta (M), yellow (Y), cyan (C), and black (K). The control unit 14 can print a color image on the printing sheet P by controlling each of the head groups 8A to discharge the plurality of colors of ink onto the printing sheet P.

Note that a surface treatment may be performed on the printing sheet P, by discharging a coating agent from the liquid discharge head 8 onto the printing sheet P.

Furthermore, the number of the liquid discharge heads 8 included in one head group 8A and the number of the head groups 8A provided in the printer 1 can be changed as appropriate in accordance with printing targets and printing conditions. For example, if the color to be printed on the printing sheet P is a single color and the range of the printing can be covered by a single liquid discharge head 8, only a single liquid discharge head 8 may be provided in the printer 1.

The printing sheet P thus subjected to the printing process inside the head case 5 is conveyed by the conveying rollers 9 to the outside of the head case 5, and passes through the inside of the dryer 10. The dryer 10 dries the printing sheet P after the printing process. The printing sheet P thus dried by the dryer 10 is conveyed by the conveying rollers 11 and then collected by the collection roller 13.

In the printer 1, by drying the printing sheet P with the dryer 10, it is possible to suppress bonding between the printing sheets P rolled while being overlapped with each other, and rubbing between undried liquid at the collection roller 13.

The sensor unit 12 includes a position sensor, a speed sensor, a temperature sensor, and the like. Based on information from the sensor unit 12, the control unit 14 can determine the state of each part of the printer 1 and control each part of the printer 1.

In the printer 1 described above, the printing sheet P is the printing target (i.e., the recording medium), but the printing target in the printer 1 is not limited to the printing sheet P, and a roll type fabric or the like may be the printing target.

Furthermore, instead of directly conveying the printing sheet P, the printer 1 may be mounted on a conveyor belt and then conveyed. If a conveyor belt is used, the printing target of the printer 1 can be flat paper, cut cloth, wood, tile, or the like.

Furthermore, the printer 1 may discharge a liquid containing electrically conductive particles from the liquid discharge head 8, to print a wiring pattern or the like of an electronic device. Furthermore, the printer 1 may discharge liquid containing a predetermined amount of liquid chemical agent or liquid containing the chemical agent from the liquid discharge head 8 onto a reaction vessel or the like to produce chemicals.

The printer 1 may also include a cleaning unit for cleaning the liquid discharge heads 8. The cleaning unit cleans the liquid discharge heads 8 by, for example, a wiping process or a capping process.

The wiping process is, for example, a process of removing liquid attached to a second surface 24*b* (see FIG. 3) of a flow channel member 24 (see FIG. 3), which is an example of a surface of a portion onto which the liquid is discharged, by rubbing the second surface 24*b* with a flexible wiper.

The capping process is performed as follows, for example. First of all, a cap is provided to cover the second surface 24*b* of the flow channel member 24 which is an example of the portion onto which the liquid is discharged (this action is referred to as capping). As a result, a substantially sealed space is formed between the second surface 24*b* and the cap.

The discharge of liquid is then repeated in such a sealed space. As a result, liquid with a viscosity higher than that in the normal state, foreign matter, or the like clogging discharge holes 243 (see FIG. 6) can be removed.

Configuration of Liquid Discharge Head

Figure 3:
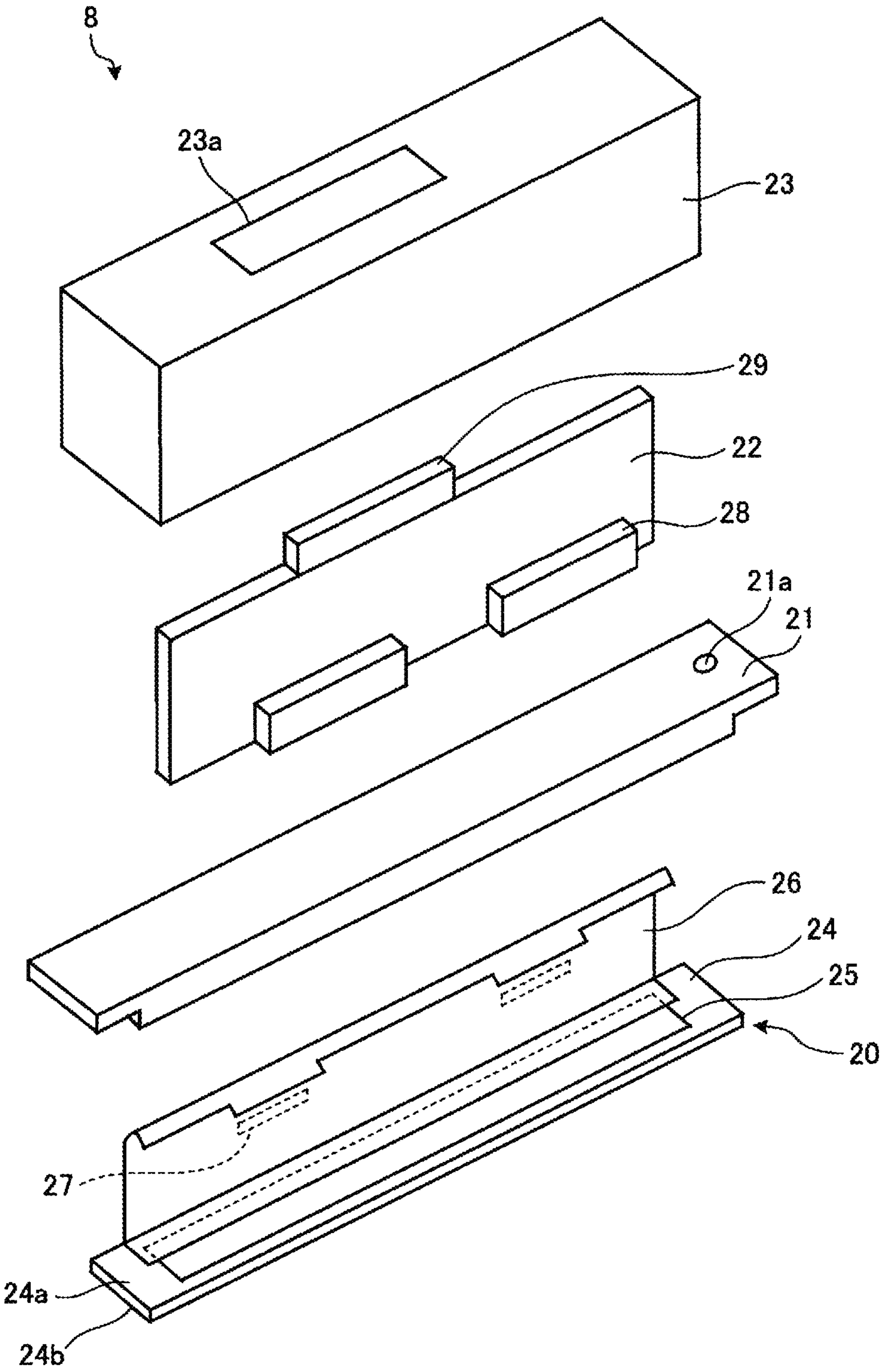
FIG. 3 is an exploded perspective view illustrating a schematic configuration of a liquid discharge head according to the embodiment.

Next, the configuration of the liquid discharge head 8 according to the embodiment will be described with reference to FIG. 3. FIG. 3 is an exploded perspective view illustrating a schematic configuration of the liquid discharge head 8 according to the embodiment.

As illustrated in FIG. 3, the liquid discharge head 8 includes a head main body 20, a supply member 21, a circuit substrate 22, and a head cover 23. The head main body 20 includes the flow channel member 24, a piezoelectric actuator substrate 25, a signal transmission unit 26, and a drive IC 27.

The flow channel member 24 of the head main body 20 has a substantially flat plate shape and includes a first surface 24*a*, which is one main surface, and the second surface 24*b* located on a side opposite to the first surface 24*a*. The first surface 24*a* has an opening 241*a* (see FIG. 4), and a liquid is supplied into the flow channel member 24 from the supply member 21 described later through the opening 241*a*.

A plurality of the discharge holes 243 (see FIG. 4) that discharge liquid onto the printing sheet P are located on the second surface 24*b*. Furthermore, a flow channel through which liquid flows from the first surface 24*a* to the second surface 24*b* is located inside the flow channel member 24.

The piezoelectric actuator substrate 25 is located on the first surface 24*a* of the flow channel member 24. The piezoelectric actuator substrate 25 includes a plurality of the displaced elements 30 (see FIG. 6). The displaced elements 30 are examples of a pressing unit. The displaced elements 30 are located on the first surface 24*a* of the flow channel member 24. The piezoelectric actuator substrate 25 will be described later with reference to FIG. 6.

Two signal transmission units 26 are electrically connected to the piezoelectric actuator substrate 25. Each signal transmission unit 26 includes a plurality of the drive integrated circuits (ICs) 27. Note that, in FIG. 3, one of the signal transmission units 26 is omitted for ease of understanding.

The signal transmission unit 26 supplies a signal to each displaced element 30 of the piezoelectric actuator substrate 25. Examples of the signal transmission unit 26 include a flexible printed circuit (FPC) and the like.

The drive IC 27 is provided in the signal transmission unit 26. The drive IC 27 controls the driving of each displaced element 30 in the piezoelectric actuator substrate 25.

Note that the head main body 20 has a discharge surface from which the liquid is discharged and an opposite surface located on a side opposite to the discharge surface. In the following description, the discharge surface is described as the second surface 24*b* of the flow channel member 24 and the opposite surface is described as the first surface 24*a* of the flow channel member 24.

The supply member 21 is located on the opposite surface side of the head main body 20. The supply member 21 has a flow channel including a reservoir 43 (described later) therein (see FIG. 7), and is supplied with liquid from the outside through an opening 21*a*. The supply member 21 has a function of supplying liquid to the flow channel member 24 and a function of storing the liquid to be supplied. Note that FIGS. 3 (and FIG. 7) schematically illustrates the shape of the supply member 21. The details of the flow channel in the supply member 21 will be described later with reference to FIG. 7 and other figures.

The circuit substrate 22 is provided in a standing manner on a surface on the side of the supply member 21 opposite to the head main body 20. A plurality of connectors 28 are located on an end portion of the circuit substrate 22 on the supply member 21 side. An end portion of the signal transmission unit 26 is housed in each connector 28.

A connector 29 used for power supply is located on an end portion of the circuit substrate 22 on a side opposite to the supply member 21. The circuit substrate 22 distributes current, supplied from the outside via the connector 29, to the connectors 28 to supply the current to the signal transmission unit 26.

The head cover 23 is located on the opposite surface side of the head main body 20 and covers the signal transmission unit 26 and the circuit substrate 22. Thus, the liquid discharge head 8 can seal the signal transmission unit 26 and the circuit substrate 22.

The head cover 23 includes an opening 23*a*. The connector 29 of the circuit substrate 22 is inserted through the opening 23*a* to be exposed to the outside.

The drive IC 27 is in contact with an interior side surface of the head cover 23. The drive IC 27 is pressed against the interior side surface of the head cover 23, for example. As a result, heat generated by the drive IC 27 can be dissipated (radiated) through a contact portion on the side surface of the head cover 23.

Note that the liquid discharge head 8 may further include a member other than the member illustrated in FIG. 3.

Configuration of Head Main Body

Figure 4:
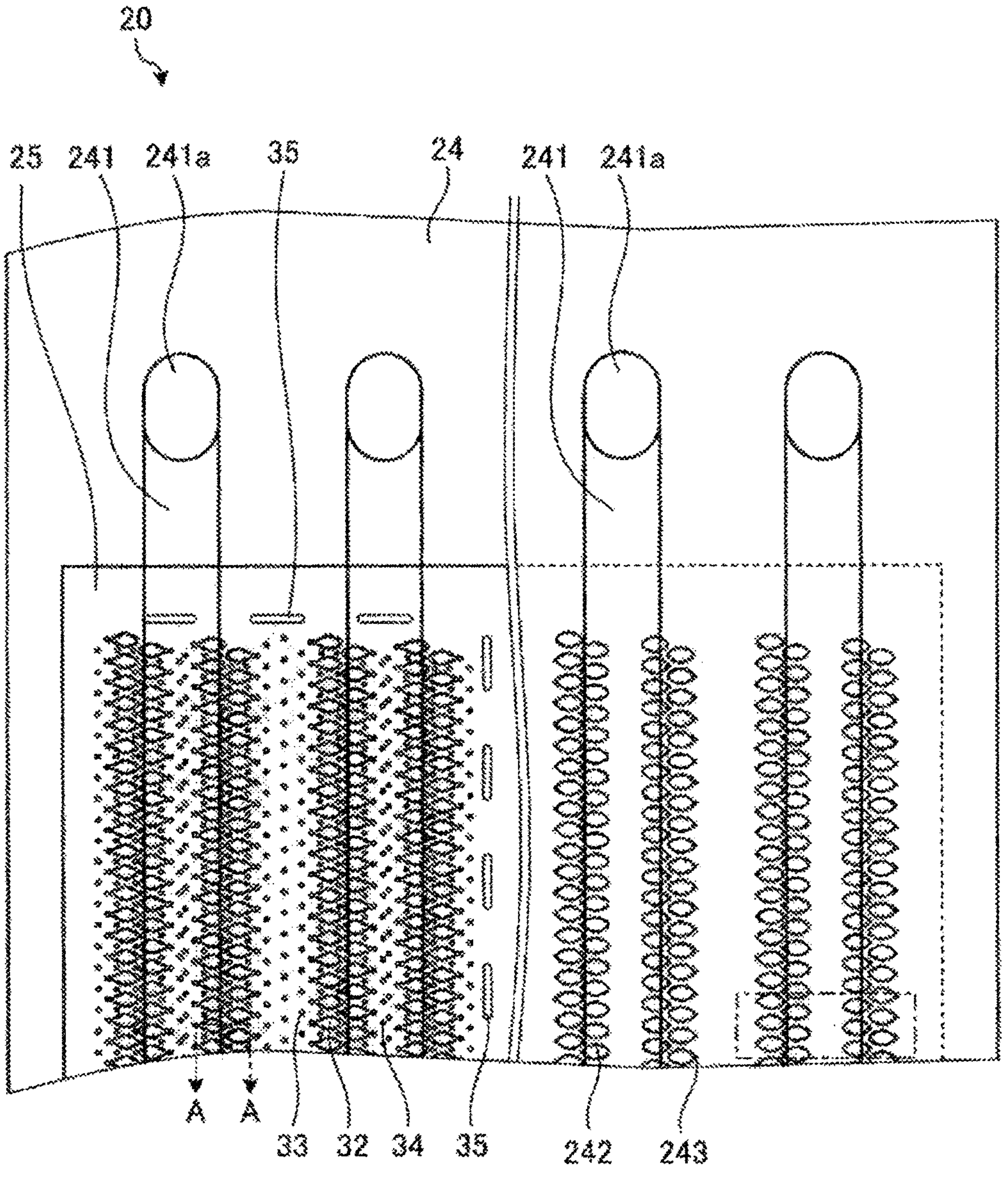
FIG. 4 is an enlarged plan view of the liquid discharge head illustrated in FIG. 3.
Figure 5:
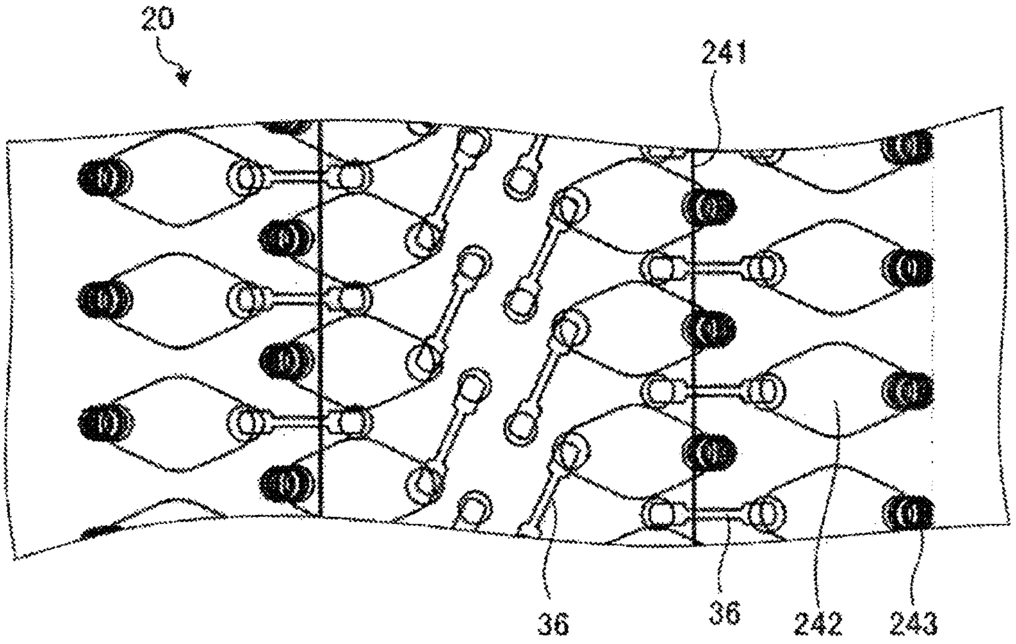
FIG. 5 is an enlarged view of a region in the dot-dash line in FIG. 4.
Figure 6:
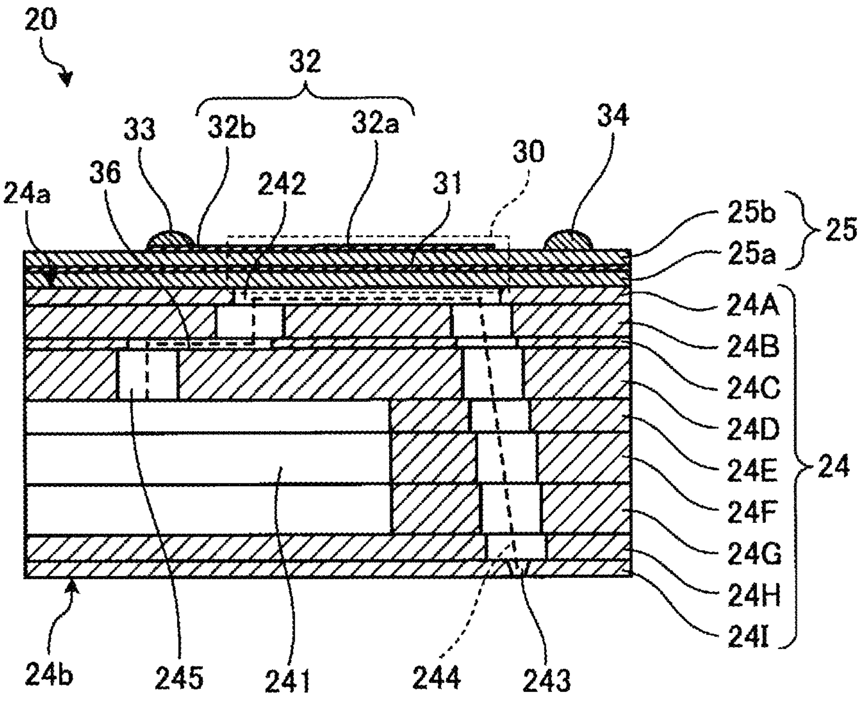
FIG. 6 is a cross-sectional view taken along line A-A in FIG. 4.

Next, the configuration of the head main body 20 according to the embodiment will be described with reference to FIGS. 4 to 6. FIG. 4 is an enlarged plan view of the head main body 20 according to the embodiment. FIG. 5 is an enlarged view of a region surrounded by a dot-dash line illustrated in FIG. 4. FIG. 6 is a cross-sectional view taken along line A-A in FIG. 4.

As illustrated in FIG. 4, the head main body 20 includes the flow channel member 24 and the piezoelectric actuator substrate 25. The flow channel member 24 includes a supply manifold 241, a plurality of pressurizing chambers 242, and the plurality of discharge holes 243.

The plurality of pressurizing chambers 242 are connected to the supply manifold 241. The plurality of discharge holes 243 are connected to the plurality of pressurizing chambers 242, respectively.

Each pressurizing chamber 242 opens to the first surface 24*a* (see FIG. 6) of the flow channel member 24. Furthermore, the first surface 24*a* of the flow channel member 24 has an opening 241*a* that connects to the supply manifold 241. Liquid is supplied from the supply member 21 (see FIG. 2), to the inside of the flow channel member 24 through the opening 241*a*.

In the example illustrated in FIG. 4, the head main body 20 has four supply manifolds 241 inside the flow channel member 24. The supply manifold 241 has an elongated shape extending along the longitudinal direction of the flow channel member 24. The opening 241*a* is located in the first surface 24*a* of the flow channel member 24 at either end of the supply manifold 241.

The plurality of pressurizing chambers 242 are positioned in the flow channel member 24 in a two-dimensionally spreading manner. Each pressurizing chamber 242 is a hollow region having a substantially diamond-shaped planar shape with rounded corners. The pressurizing chamber 242 opens to the first surface 24*a* of the flow channel member 24, and is closed when the piezoelectric actuator substrate 25 is joined to the first surface 24*a*.

The pressurizing chambers 242 form a pressurizing chamber row arranged in the longitudinal direction. The pressurizing chambers 242 in two adjacent pressurizing chamber rows are arranged alternately between the two pressurizing chamber rows. One pressurizing chamber group includes four pressurizing chamber rows connected to one supply manifold 241. In the example illustrated in FIG. 4, the flow channel member 24 includes four pressurizing chamber groups.

Moreover, the relative internal arrangement of the pressurizing chambers 242 among the pressurizing chamber groups is the same, with the pressurizing chamber groups arranged while being slightly shifted from each other in the longitudinal direction. The discharge holes 243 are disposed at positions outside regions, of the flow channel member 24, facing the supply manifolds 241. Thus, no discharge hole 243 overlaps with the supply manifold 241 in a transparent view of the flow channel member 24 from the first surface 24*a* side.

Furthermore, in a plan view, the discharge holes 243 are disposed within a region in which the piezoelectric actuator substrate 25 is provided. One group of such discharge holes 243 occupies a region of approximately the same size and shape as the piezoelectric actuator substrate 25.

Droplets are discharged through the discharge holes 243 by displacing the displaced elements 30 (see FIG. 6), which are pressing units of the corresponding piezoelectric actuator substrate 25.

The pressurizing chamber 242 and the supply manifold 241 are connected via an individual supply flow channel 245 (see FIG. 6). The individual supply flow channel 245 includes an aperture 36 with a smaller width than the other portions. The aperture 36 has a smaller width than the other portions of the individual supply flow channel 245, and thus has a high flow channel resistance. With the aperture 36 thus having a higher flow channel resistance, pressure produced in the pressurizing chamber 242 is less likely to escape to the supply manifold 241.

As illustrated in FIG. 6, the flow channel member 24 has a stack structure in which a plurality of plates are stacked. These plates include a cavity plate 24A, a base plate 24B, an aperture plate 24C, a supply plate 24D, manifold plates 24E, 24F, and 24G, a cover plate 24H, and a nozzle plate 24I arranged in this order from the upper surface of the flow channel member 24.

A large number of holes are located in the plate. The thickness of the plate is approximately 10 μm to 300 μm. With this configuration, the holes can be formed with high accuracy. The plates are stacked in alignment so that the holes communicate with each other to form an individual flow channel 244 and the supply manifold 241.

In the head main body 20, the pressurizing chamber 242 is provided on the upper surface of the flow channel member 24, the supply manifold 241 is provided on the lower surface side of the interior, and the discharge holes 243 are provided in the lower surface, and portions forming the individual flow channel 244 are provided at different positions close to each other. The head main body 20 has a configuration in which the supply manifold 241 and the discharge hole 243 are connected to each other via the pressurizing chamber 242.

The piezoelectric actuator substrate 25 includes piezoceramic layers 25*a* and 25*b*, a common electrode 31, an individual electrode 32, a connection electrode 33, a dummy connection electrode 34, and a surface electrode 35 (see FIG. 4).

The piezoelectric actuator substrate 25 has the piezoceramic layer 25*a*, the common electrode 31, the piezoceramic layer 25*b*, and the individual electrode 32 stacked in this order.

The piezoceramic layers 25*a* and 25*b* each have a thickness of approximately 20 μm. Either of the piezoceramic layers 25*a* and 25*b* extends across the plurality of pressurizing chambers 242. The piezoceramic layers 25*a* and 25*b* may each be made of a ferroelectric lead zirconate titanate (PZT)-based ceramic material.

The common electrode 31 is positioned substantially entirely across the surface direction in the region between the piezoceramic layer 25*a* and the piezoceramic layer 25*b*. Thus, the common electrode 31 overlaps with all of the pressurizing chambers 242 in the region facing the piezoelectric actuator substrate 25. The thickness of the common electrode 31 is approximately 2 μm. A metal material such as an Ag—Pd based material can be used for the common electrode 31.

The individual electrode 32 includes an individual electrode main body 32*a* and an extraction electrode 32*b*. The individual electrode main body 32*a* is positioned in a region, of the piezoceramic layer 25*b*, facing the pressurizing chamber 242. The individual electrode main body 32*a* has a shape that is one size smaller than that of the pressurizing chamber 242 and is substantially similar to that of the pressurizing chamber 242.

The extraction electrode 32*b* is extracted from the individual electrode main body 32*a*. The connection electrode 33 is positioned at a portion, of one end of the extraction electrode 32*b*, that is extracted to be outside the region facing the pressurizing chamber 242. The individual electrode 32 may be made of, for example, a metal material such as an Au-based metal material.

The connection electrode 33 is positioned on the extraction electrode 32*b*, has a thickness of approximately 15 μm, and has a protruding shape. The connection electrode 33 is electrically bonded to an electrode provided in the signal transmission unit 26 (see FIG. 3). The connection electrode 33 may be made of, for example, silver-palladium, including glass frit.

The dummy connection electrode 34 is positioned on the piezoceramic layer 25*b* and is positioned so as not to overlap with various electrodes such as the individual electrode 32. The dummy connection electrode 34 connects the piezoelectric actuator substrate 25 and the signal transmission unit 26 to each other, and increases the connection strength.

Furthermore, the dummy connection electrode 34 makes uniform the distribution of the contact positions between the piezoelectric actuator substrate 25 and the piezoelectric actuator substrate 25, and stabilizes the electrical connection. The dummy connection electrode 34 need only be made of a material and by a process that are the same as those for the connection electrode 33.

The surface electrode 35 is provided at a position on the piezoceramic layer 25*b* where the individual electrode 32 is not provided. The surface electrode 35 is connected to the common electrode 31 through a via hole located in the piezoceramic layer 25*b*. Thus, the surface electrode 35 is grounded and maintained at the ground potential. The surface electrode 35 need only be made of a material and by a process that are the same as those for the individual electrode 32.

A plurality of the individual electrodes 32 are individually electrically connected to the control unit 14 (see FIG. 1) via the signal transmission unit 26 and wiring, in order to individually control the potentials of each individual electrode 32. The piezoceramic layer 25*b* sandwiched by the individual electrode 32 and the common electrode 31 serves as an active section. Thus, in a state where the potential is set to be different between the individual electrode 32 and the common electrode 31, when an electric field is applied to the piezoceramic layer 25*b* in the polarization direction, a portion of the piezoceramic layer 25*b* where the electric field is applied is distorted by the piezoelectric effect.

As a result, the individual electrode 32, the piezoceramic layer 25*b*, and the common electrode 31, facing the pressurizing chamber 242, function as the displaced elements 30. Unimorphic deformation of the displaced elements 30 results in the pressurizing chamber 242 being pressed and liquid to be discharged through the discharge hole 243.

Here, a drive procedure in the present embodiment will be described. First, the individual electrode 32 is set to have a higher potential (hereinafter referred to as "high potential") than the common electrode 31 in advance. Then, each time a discharge request is made, the individual electrode 32 is set to the same potential as the common electrode 31 (hereinafter referred to as "low potential"), and then is again set to the high potential at a predetermined timing.

Thus, at the timing when the individual electrode 32 shifts to the low potential, the piezoceramic layers 25*a* and 25*b* return to their original shape, and the volume of the pressurizing chamber 242 increases over that in the initial state (a state where the potential differs between the two electrodes).

Then, the pressurizing chamber 242 is provided with negative pressure, whereby liquid is sucked from the supply manifold 241 side into the pressurizing chamber 242. Thereafter, at the timing when the individual electrode 32 is set to the high potential again, the piezoceramic layers 25*a* and 25*b* deform to protrude toward the pressurizing chamber 2452 side. Then, the volume in the pressurizing chamber 242 decreases, resulting in the pressurizing chamber 242 having positive pressure therein.

As a result, the pressure applied to the liquid inside the pressurizing chamber 242 increases, whereby the droplets are discharged. In other words, a drive signal including pulses based on the high potential is supplied to the individual electrode 32 to discharge the droplets.

The pulse width need only be an acoustic length (AL), corresponding to the length of time required for pressure waves to propagate from the aperture 36 to the discharge hole 243. With this configuration, when the inside of the pressurizing chamber 242 transitions from the negative pressure state to the positive pressure state, the pressures under the states are combined, and thereby the droplets can be discharged with higher pressure.

For gradient printing, the gradient is expressed based on the number of droplets continuously discharged from the discharge holes 243, that is, the amount (volume) of droplets adjusted based on the number of times the droplets are discharged. Thus, the droplets are discharged by a number of times corresponding to the designated gradient to be expressed, through the discharge holes 243 corresponding to the designated dot region.

Generally, when the liquid is continuously discharged, the interval between the pulses supplied for discharging the droplets may be designated as AL. As a result, periods match between a residual pressure wave of the pressure produced for the previous discharging of droplets and the pressure wave of the pressure produced for the subsequent discharging of the droplets. Thus, the residual pressure wave and the pressure wave are superimposed, whereby the droplets can be discharged with a higher pressure. Note that in this case, the later discharging involves a higher speed of the droplets and a closer distance between the landing points of the plurality of droplets.

Flow Channel Configuration of Supply Member According to First Embodiment

Figure 7:
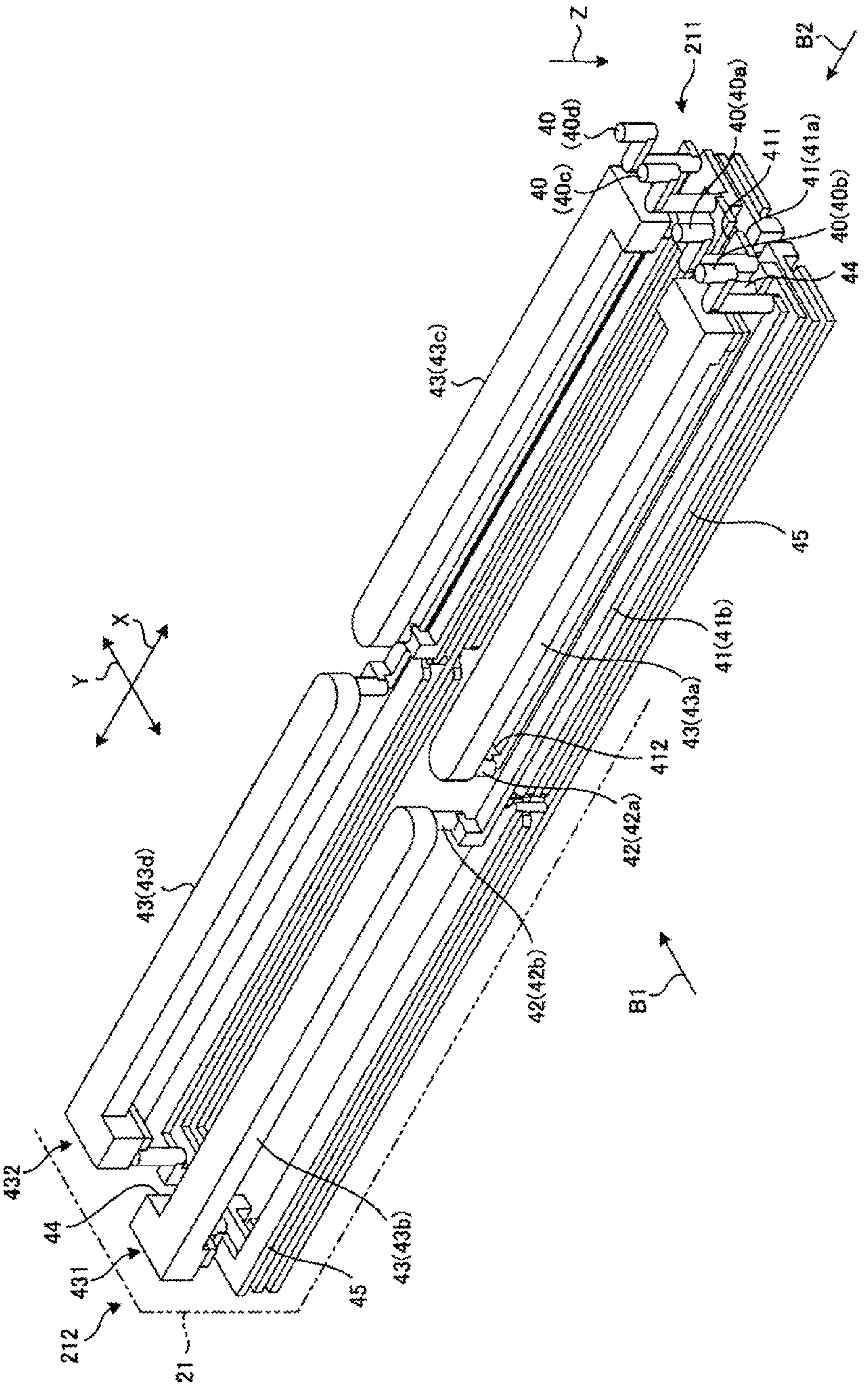
FIG. 7 is a perspective view illustrating a flow channel configuration of a supply member according to a first embodiment.
Figure 8:
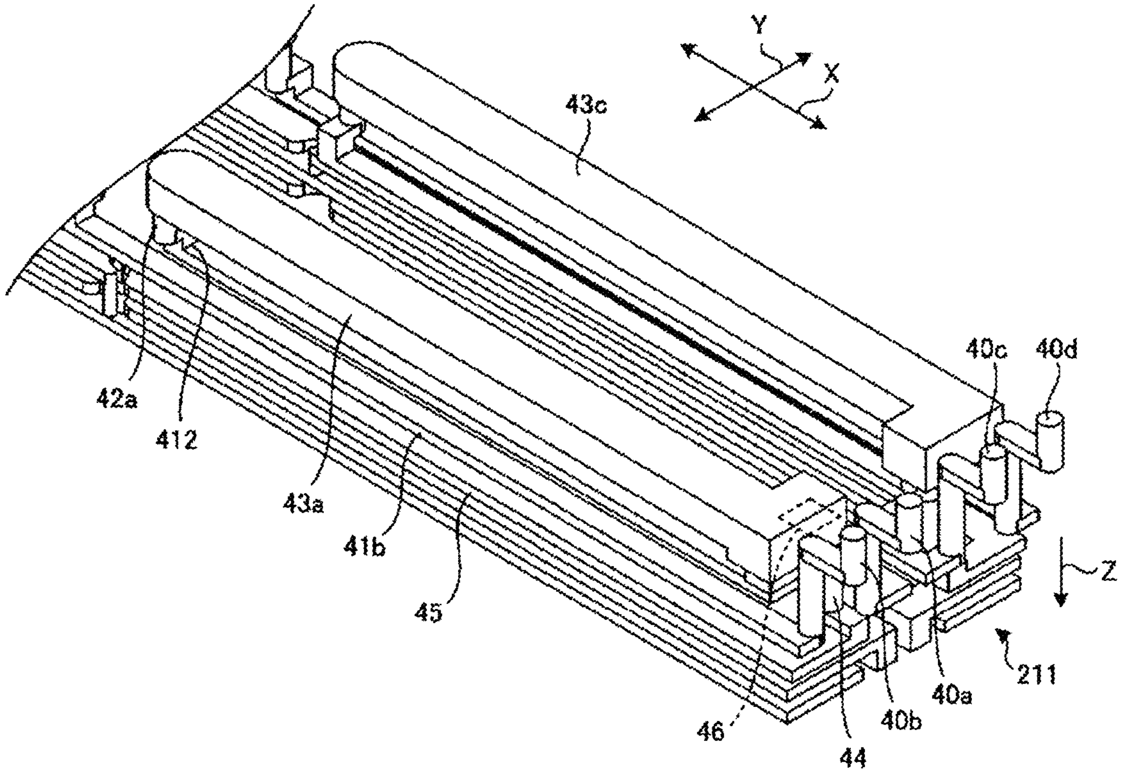
FIG. 8 is an enlarged view of a first end side in FIG. 7.
Figure 9:
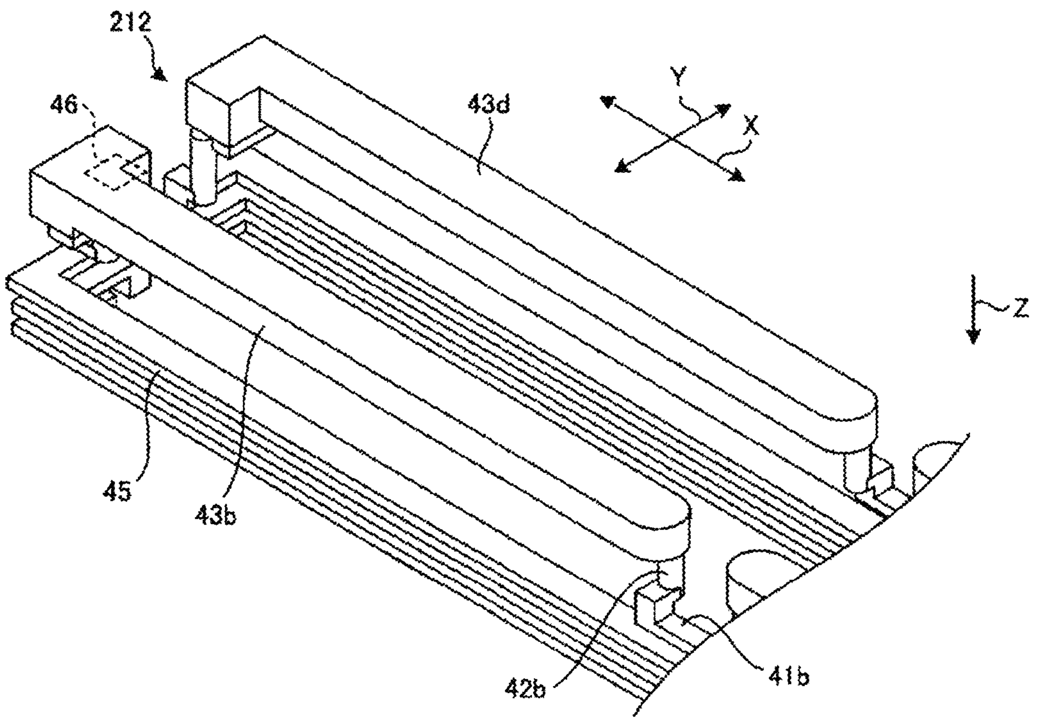
FIG. 9 is an enlarged view of a second end side in FIG. 7.

Next, the configuration of a flow channel (upstream side and downstream side in the reservoir 43) of the supply member 21 according to the first embodiment will be described with reference to FIGS. 7 to 11. FIG. 7 is a perspective view illustrating a flow channel configuration of the supply member 21 according to the first embodiment. FIG. 8 is an enlarged view of a first end 211 side in FIG. 7. FIG. 9 is an enlarged view of a second end 212 side in FIG. 7.

Figure 10:
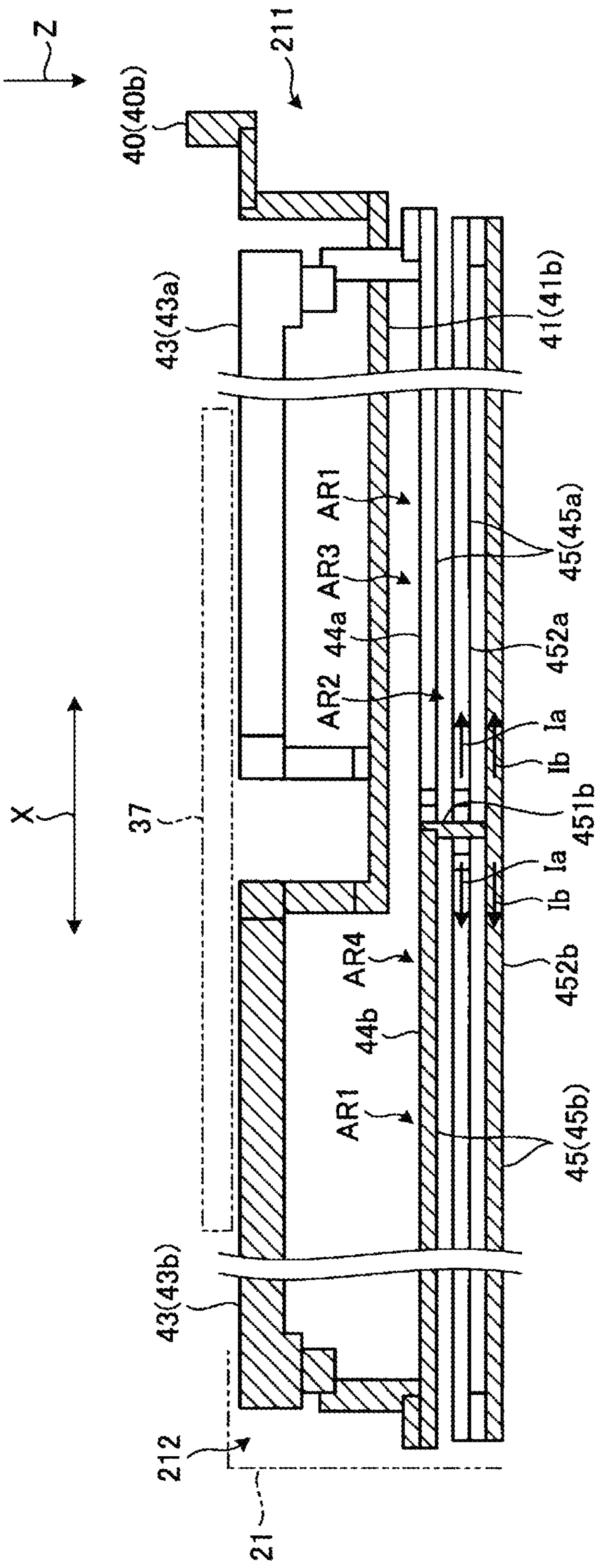
FIG. 10 is a side view as viewed in a B1 direction illustrated in FIG. 7.
Figure 11:
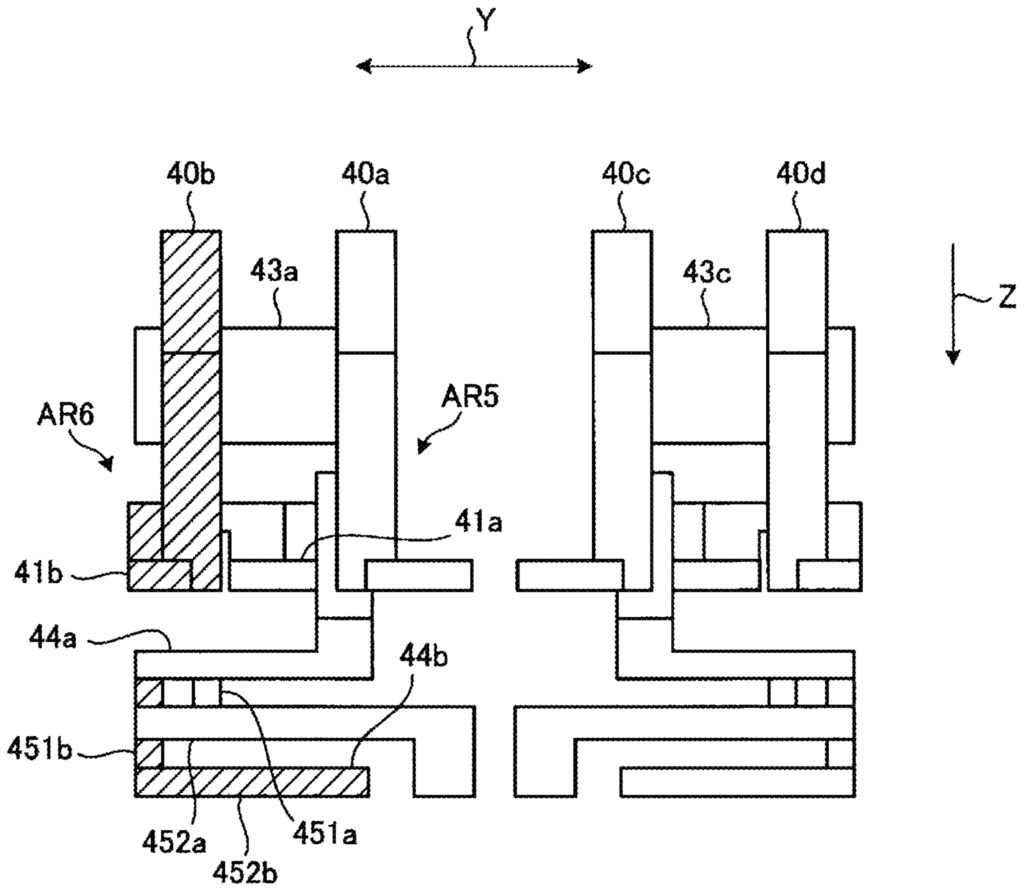
FIG. 11 is a side view as viewed in a B2 direction illustrated in FIG. 7.

FIG. 10 is a side view as viewed in a B1 direction in FIG. 7. FIG. 11 is a side view as viewed in a B2 direction in FIG. 7. Note that FIGS. 7 to 11 illustrate a space that serves as a flow channel.

The configuration of an upstream side flow channel of the supply member 21 will be described with reference to FIGS. 7 to 9. The supply member 21 is connected to the flow channel member 24 (see FIG. 6). As illustrated in FIG. 7, the supply member 21 extends in a first direction X from the first end 211, which is a first end portion in the longitudinal direction, to the second end 212, which is a second end portion in the longitudinal direction. The supply member 21 includes a first supply flow channel 41, a first connection flow channel 42, and the reservoir 43.

Liquid from a supply port 40 flows in the first supply flow channel 41. The first connection flow channel 42 is connected to the first supply flow channel 41. The liquid from the first supply flow channel 41 flows in the first connection flow channel 42. The reservoir 43 stores liquid from the first connection flow channel 42 and supplies this liquid to the flow channel member 24.

The first connection flow channel 42 is connected to a surface of the reservoir 43 on the side of the second surface 24*b* (see FIG. 6) of the flow channel member 24 (the lower surface of the reservoir 43 in FIG. 7).

As illustrated in FIG. 7, the reservoir 43 extends in the first direction X. The supply member 21 includes a plurality of the reservoirs 43. In the present embodiment, the supply member 21 includes two reservoir sets, that is, a first reservoir set 431 and a second reservoir set 432 each including two reservoirs 43 as a pair.

The first reservoir set 431 includes a reservoir A (reservoir 43*a*) and a reservoir B (reservoir 43*b*). The reservoir 43*a* and the reservoir 43*b* respectively have equivalent substantially rectangular shapes, and are arranged in series in the first direction X with their longitudinal directions extending along the first direction X. The reservoir 43*a* is located on the first end 211 side and the reservoir 43*b* is located on the second end 212 side.

As illustrated in FIG. 8, the first reservoir set 431 of the supply member 21 includes, in addition to the reservoir 43*a* located on the first end 211 side, a supply port A (supply port 40*a*), a supply flow channel A (first supply flow channel 41*a*), and a connection flow channel A (first connection flow channel 42*a*).

The supply port 40*a* is a liquid inlet into which liquid is supplied from upstream. The first supply flow channel 41*a* is connected to the supply port 40*a*. The first supply flow channel 41*a* includes a portion (extending portion 411) extending in the first direction X.

The first connection flow channel 42*a* is connected to the first supply flow channel 41*a*. The reservoir 43*a* is connected to the first connection flow channel 42*a*. The first connection flow channel 42*a* is connected to the second surface 24*b* side of the reservoir 43*a*.

The first connection flow channel 42*a* is connected to the second end 212 side of the reservoir 43*a*. The first supply flow channel 41*a* includes a portion (bent portion 412) extending in a second direction Y that intersects with (e.g., is orthogonal to) the first direction X on the second end 212 side. In the first supply flow channel 41*a*, the bent portion 412 is connected to the first connection flow channel 42*a*.

As illustrated in FIG. 9, the first reservoir set 431 of the supply member 21 includes, in addition to the reservoir 43*b* located on the second end 212 side, a supply port B (supply port 40*b*), a supply flow channel B (first supply flow channel 41*b*), and a connection flow channel B (first connection flow channel 42*b*).

The supply port 40*b* is a liquid inlet into which liquid is supplied from upstream. The first supply flow channel 41*b* is connected to the supply port 40*b*.

The first connection flow channel 42*b* is connected to the first supply flow channel 41*b*. The reservoir 43*b* is connected to the first connection flow channel 42*b*. The first connection flow channel 42*b* is connected to the second surface 24*b* side of the reservoir 43*b*.

The first connection flow channel 42*b* is connected to the first end 211 side of the reservoir 43*b*. The first supply flow channel 41*b* extends along the first direction X.

In the first reservoir set 431, the supply port 40*a* and the supply port 40*b*, serving as the interface of the supply member 21, are each located on the first end 211 side.

As illustrated in FIG. 7, the second reservoir set 432 includes a reservoir C (reservoir 43*c*) and a reservoir D (reservoir 43*d*). As in the cases of the reservoir 43*a* and the reservoir 43*b*, the reservoir 43*c* and the reservoir 43*d* respectively have equivalent substantially rectangular shapes, and are arranged in series in the first direction X with their longitudinal directions extending along the first direction X. The reservoir 43*c* is located on the first end 211 side and the reservoir 43*d* is located on the second end 212 side.

The reservoir 43*c* faces the reservoir 43*a* in the direction (second direction Y) orthogonal to the first direction X with a space in between, and the reservoir 43*d* faces the reservoir 43*b* in the second direction Y with a space in between. Note that the second reservoir set 432 is symmetrical with respect to the first reservoir set 431 about the second direction Y, and as in the first reservoir set 431 described above, has the reservoir 43*c* and the reservoir 43*d* each including the supply port 40, the supply flow channel (first supply flow channel) 41, and the connection flow channel (first connection flow channel) 42.

Also in the second reservoir set 432, a supply port 40*c* and a supply port 40*d*, serving as the interface of the supply member 21, are each located on the first end 211 side. In other words, the interface of the supply member 21 is concentrated on the first end 211 side.

As illustrated in FIG. 7, the supply member 21 includes a second connection flow channel 44 and a second supply flow channel 45. The second connection flow channel 44 and the second supply flow channel 45 are flow channels through which liquid flows from the reservoir 43 toward the flow channel member 24 (see FIG. 6). The second connection flow channel 44 and the second supply flow channel 45 are arranged in this order in the direction from the reservoir 43 toward the flow channel member 24, that is, from the upstream side.

The second connection flow channel 44 is connected to the reservoir 43. For example, the second connection flow channel 44 is connected to a surface of the reservoir 43 on the side of the second surface 24*b* of the flow channel member 24 (the lower surface of the reservoir 43 in FIG. 7). The second supply flow channel 45 is connected to the second connection flow channel 44. The second supply flow channel 45 supplies liquid toward the flow channel member 24.

As illustrated in FIGS. 8 and 9, the supply member 21 includes a filter 46. The filter 46 is located between the reservoir 43 and the second connection flow channel 44.

According to such a first embodiment, the first connection flow channel 42 is connected to the second surface 24*b* side of the reservoir 43. Thus, even if bubbles enter the first supply flow channel 41, the direction in which the liquid is supplied to the reservoir 43 is the same as the direction of buoyancy acting on the bubbles. Thus, the bubbles are less likely to remain in the first connection flow channel 42, whereby the hindering of the liquid flow by the bubbles can be suppressed. As a result, insufficient supply of liquid to the reservoir 43 can be prevented.

Furthermore, the supply port 40*a* of the reservoir 43*a* and the supply port 40*b* of the reservoir 43*b* are both located on the first end 211 side, and thus the two supply ports 40*a* and 40*b* can be connected to the respective supply sources from the first end 211 side. This facilitates the operation of incorporating the head main body 20 into the printer 1, whereby productivity can be improved.

Furthermore, the bent portion 412 extending in the second direction Y is provided in the first supply flow channel 41*a* close to the supply port 40*a*, so that the first supply flow channel 41*a* and the first supply flow channel 41*b* can have approximately equal flow channel lengths, whereby pressure loss during flow to the reservoirs 43*a* and 43*b* can be approximated.

In addition, since the first supply flow channel 41*b* far from the supply port 40*b* extends in the first direction X, the first supply flow channel 41*b* can have a minimum flow channel length, and the pressure loss in the reservoir 43*b* can be reduced.

Furthermore, the second connection flow channel 44 supplying liquid toward the flow channel member 24 is connected to a second surface 21*b* side of the reservoir 43, whereby bubbles that have entered the reservoir 43 can be prevented from entering a downstream side flow channel such as the second connection flow channel 44 or the second supply flow channel 45. Even if the bubbles enter the second connection flow channel 44 and the second supply flow channel 45, the bubbles easily return to the reservoir 43, whereby the bubbles are less likely to remain in the downstream side flow channel.

The filter 46 is located between the reservoir 43 and the second connection flow channel 44, so that foreign matter can be removed. Further, the entry of foreign matter into the downstream side flow channel, such as the second connection flow channel 44 or the second supply flow channel 45, can be suppressed.

The configuration of a downstream side flow channel of the supply member 21 will be described with reference to FIGS. 10 and 11. Note that in FIGS. 10 and 11, one of the two reservoirs 43*a* and 43*b* (the reservoir 43*b* and the flow channel around the reservoir 43*b*) is hatched. As illustrated in FIGS. 10 and 11, the supply member 21 includes the supply port 40, the first supply flow channel 41, the reservoir 43, and the second supply flow channel 45.

As illustrated in FIG. 10, a heater 37 is located on the supply member 21. The heater 37 is located on the upper surface of the supply member 21 corresponding to the two reservoirs 43*a* and 43*b* and warms the liquid inside the two reservoirs 43*a* and 43*b*. Although not illustrated in the figure, the heater 37 is also located on the two reservoirs 43*c* and 43*d*.

The first supply flow channel 41 is connected to the supply port 40, and the reservoir 43 is connected to the first supply flow channel 41. The second supply flow channel 45 is connected to the reservoir 43 and the flow channel member 24 (see FIG. 6).

A plurality of the reservoirs 43 and a plurality of the second supply flow channels 45 are provided. The supply member 21 at least includes the reservoir 43*a*, a second supply flow channel A (second supply flow channel 45*a*), the reservoir 43*b*, and a second supply flow channel B (second supply flow channel 45*b*). The second supply flow channel 45*a* is connected to the reservoir 43*a* and the flow channel member 24. The second supply flow channel 45*b* is connected to the reservoir 43*b* and the flow channel member 24.

The supply member 21 includes a first overlapping region AR1 in which the second supply flow channel 45*a* and the second supply flow channel 45*b* overlap, in the flow channel on the downstream side of the reservoir 43. In the first overlapping region AR1, the second supply flow channel 45*a* and the second supply flow channel 45*b* overlap as viewed in the third direction Z.

The second supply flow channel 45*a* includes a branch portion A (branch portion 451*a*) and a branch flow channel A (branch flow channel 452*a*). The branch flow channel 452*a* is located more on the downstream side than the branch portion 451*a*. The second supply flow channel 45*b* includes a branch portion B (branch portion 451*b*) and a branch flow channel B (branch flow channel 452*b*). The branch flow channel 452*b* is located more on the downstream side than the branch portion 451*b*.

The supply member 21 includes a second overlapping region AR2 in which the branch flow channel 452*a* and the branch flow channel 452*b* overlap, in the flow channel on the downstream side of the reservoir 43. In the second overlapping region AR2, the branch flow channel 452*a* and the branch flow channel 452*b* overlap as viewed in the third direction Z.

In the second overlapping region AR2, liquid Ia flowing in the branch flow channel 452*a* and liquid Ib flowing in the branch flow channel 452*b* flow as parallel flows. Parallel flow means that the liquid Ia and the liquid Ib flow in the same direction. In FIG. 10, the liquid Ia and the liquid Ib flow in the same direction in the first direction X as viewed in the second direction Y (see FIG. 7).

Although not illustrated in the figures, in the second overlapping region AR2, the liquid Ia flowing in the branch flow channel 452*a* and the liquid Ib flowing in the branch flow channel 452*b* may be configured to flow as counter flows. Counter flow means that the liquid Ia and the liquid Ib flow in different directions. In FIG. 10, the liquid Ia and the liquid Ib flow in different directions in the first direction X as viewed in the second direction Y.

The supply member 21 includes a connection flow channel (second connection flow channel) 44*a*. The second connection flow channel 44*a* has one end connected to the reservoir 43*a* and the other end connected to the branch flow channel 452*a*. The supply member 21 includes a third overlapping region AR3 in which the second connection flow channel 44*a* and the branch flow channel 452*b* overlap, in the flow channel on the downstream side of the reservoir 43*a* located at the first end 211. Note that the overlapping in the third overlapping region AR3 occurs as viewed in the third direction Z.

The supply member 21 includes a second connection flow channel 44*b*. The second connection flow channel 44*b* has one end connected to the reservoir 43*b* and the other end connected to the branch flow channel 452*b*. The supply member 21 includes a fourth overlapping region AR4 in which the second connection flow channel 44*b* and the branch flow channel 452*a* overlap, in the flow channel on the downstream side of the reservoir 43*b* located at the second end 212. Note that the overlapping in the fourth overlapping region AR4 occurs as viewed in the third direction Z.

The supply member 21 includes a fifth overlapping region AR5 in which the first supply flow channel 41*a* connected to the supply port 40*a* and the second connection flow channel 44*b* overlap as illustrated in FIG. 11, in the flow channel on the downstream side of the reservoir 43*a* located at the first end 211. Note that the overlapping in the fifth overlapping region AR5 occurs as viewed in the third direction Z.

The supply member 21 includes a sixth overlapping region AR6 in which the first supply flow channel 41*b* connected to the supply port 40*b* and the second connection flow channel 44*a* overlap as illustrated in FIG. 11, in the flow channel on the downstream side of the reservoir 43*b* located at the second end 212. Note that the overlapping in the sixth overlapping region AR6 occurs as viewed in the third direction Z.

According to the first embodiment as described above, because the first overlapping region AR1 in which the second supply flow channel 45*a* and the second supply flow channel 45*b* overlap is provided, liquid can exchange heat with another liquid at least between a plurality of systems (two systems) including the reservoir 43*a* and the reservoir 43*b*. This contributes to the uniformization of the temperature of the liquid on the downstream side of the reservoirs 43*a* and 43*b*. As a result, degradation of the discharge performance of the liquid can be suppressed.

Furthermore, because the first overlapping region AR1 in which the second supply flow channel 45*a* and the second supply flow channel 45*b* overlap is provided to contribute to the uniformization of the temperatures of the liquids on the downstream side of the reservoirs 43*a* and 43*b*, the reservoirs 43*a* and 43*b* do not need to overlap each other. As a result, the thickness of the supply member 21 in the third direction Z is less likely to increase.

Furthermore, because the second overlapping region AR2 in which the branch flow channel 452*a* and the branch flow channel 452*b* overlap is provided, liquid can exchange heat with another liquid between a plurality of systems (two systems) as described above to contribute to the uniformization of the liquid temperature.

The liquid Ia flowing in the branch flow channel 452*a* and the liquid Ib flowing in the branch flow channel 452*b* flow as parallel flows. Thus, the liquid Ia and the liquid Ib flowing in the two branch flow channels 452*a* and 452*b* flow in the same direction while exchanging heat. As a result, an attempt to uniformize the temperatures of the liquid Ia and the liquid Ib can be facilitated.

Also in a case where the liquid Ia flowing in the branch flow channel 452*a* and the liquid Ib flowing in the branch flow channel 452*b* flow as counter flows, the liquid Ia and the liquid Ib flowing in the two branch flow channels 452*a* and 452*b* flow while exchanging heat as in the case of the parallel flow, whereby an attempt to uniformize the temperatures of the liquid Ia and the liquid Ib can be facilitated.

Furthermore, because the third overlapping region AR3 in which the second connection flow channel 44*a* and the branch flow channel 452*b* overlap is provided, the liquid flowing in the second connection flow channel 44*a* can be pre-heated with the temperature of the liquid flowing in the branch flow channel 452*b*. As a result, an attempt to uniformize the temperatures of the liquids can be facilitated.

Furthermore, because the fourth overlapping region AR4 in which the second connection flow channel 44*b* and the branch flow channel 452*a* overlap is provided, the liquid flowing in the second connection flow channel 44*b* can be pre-heated with the temperature of the liquid flowing in the branch flow channel 452*a*. As a result, an attempt to uniformize the temperatures of the liquids can be facilitated.

Furthermore, because the fifth overlapping region AR5 in which the first supply flow channel 41*a* and the second connection flow channel 44*b* overlap is provided, the liquid flowing in the first supply flow channel 41*a* can be pre-heated with the temperature of the liquid flowing in the second connection flow channel 44*b*, whereby an attempt to uniformize the temperatures of the liquids can be facilitated.

Furthermore, because the sixth overlapping region AR6 in which the first supply flow channel 41*b* and the second connection flow channel 44*a* overlap is provided, the liquid flowing in the first supply flow channel 41*b* can be pre-heated with the temperature of the liquid flowing in the second connection flow channel 44*a*, whereby an attempt to uniformize the temperatures of the liquids can be facilitated.

The supply member 21 includes the first to sixth overlapping regions AR1 to AR6 to implement efficient heat exchange. To further improve the heat exchange efficiency, overlapping areas of the first to sixth overlapping regions AR1 to AR6 need only be increased. For example, in order to increase the overlapping area of the second overlapping region AR2, the branch flow channel 452*a* and the branch flow channel 452*b* need only extend along each other in the second direction Y.

Furthermore, the overlapping flow channels may be adjacent to each other in the third direction Z. As a result, efficient heat exchange can be achieved with the first to sixth overlapping regions AR1 to AR6.

The supply member 21 is made of a metal, an alloy, or a thermosetting resin. Examples of the metal material include stainless steel such as SUS430. Examples of thermosetting resins include thermosetting epoxy resins including glass fibers and inorganic fillers. The thermal conductivity of the thermosetting epoxy resin including glass fibers or inorganic fillers may be from 0.3 to 0.7 w/m·K. Note that the coefficient of thermal expansion may be measured by a coefficient of linear expansion test method using thermomechanical analysis of plastic as defined in JIS K7197, for example.

Figure 12:
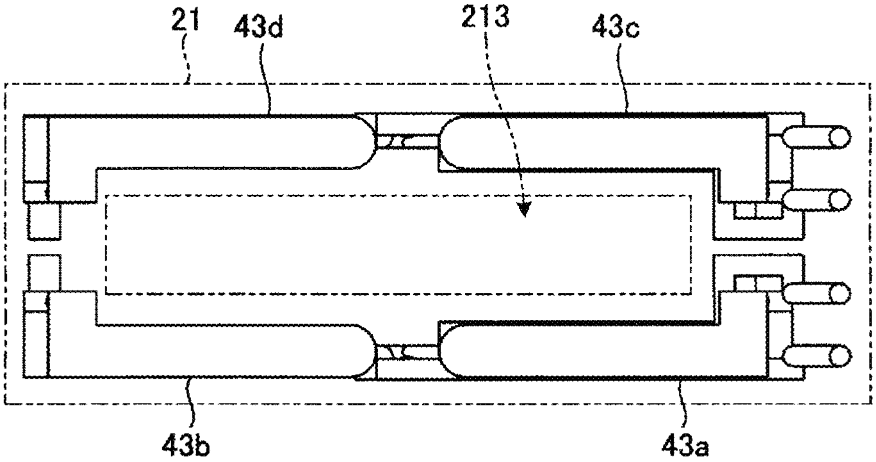
FIG. 12 is an explanatory view of a space.

FIG. 12 is an explanatory view of a space. As illustrated in FIG. 12, the supply member 21 extends in the first direction X from the first end to the second end. The reservoirs 43*a* to 43*d* include the first reservoir set that is a combination of the reservoir 43*a* and the reservoir 43*b* arranged in the first direction X with respect to the reservoir 43*a*, and the second reservoir set that is a combination of the reservoir 43*c* that faces the reservoir 43*a* in a direction orthogonal to the first direction X with a space in between and the reservoir 43*d* arranged in the first direction X with respect to the reservoir 43*c*.

In addition, an inner region of the supply member 21 as viewed in a direction perpendicular to the first surface 24*a* of the flow channel member 24, surrounded by the first reservoir set (the reservoir 43*a* and the reservoir 43*b*) and the second reservoir set (the reservoir 43*c* and the reservoir 43*d*) may be provided with a space 213 that extends through the first surface 24*a* in the direction perpendicular to the first surface 24*a*.

This can contribute to reducing the mass of the supply member 21 and the weight of the liquid discharge head. For example, when the liquid discharge head includes a circuit substrate, and the circuit substrate stands on the surface of the supply member 21 on the side provided with the first reservoir set (the reservoir 43*a* and the reservoir 43*b*) and the second reservoir set (the reservoir 43*c* and the reservoir 43*d*) as described later, heat transfer from the IC of the circuit substrate to the reservoirs 43*a* to 43*d* and the supply flow channels respectively connected thereto can be suppressed.

The outer circumference of the space 213 may extend along the first reservoir set (the reservoir 43*a* and the reservoir 43*b*) and the second reservoir set (the reservoir 43*c* and the reservoir 43*d*) and be located on the outer side of an actuator substrate (piezoelectric actuator substrate 25), as viewed in the direction perpendicular to the first surface 24*a* of the flow channel member 24.

For example, an FPC is used as the signal transmission unit 26 that supplies a signal to each of the displaced elements 30 of the piezoelectric actuator substrate 25 serving as the actuator substrate. With the outer circumference of the space 213 extending along the first reservoir set (the reservoir 43*a* and the reservoir 43*b*) and the second reservoir set (the reservoir 43*c* and the reservoir 43*d*) and being located on the outer side of the piezoelectric actuator substrate 25, a load acting on the bent portion when the FPC is gently bent (curved) to be electrically connected with the circuit substrate 22 through the space 213 can be reduced. Furthermore, heat transfer from the IC of the circuit substrate can be further suppressed.

Figure 13:
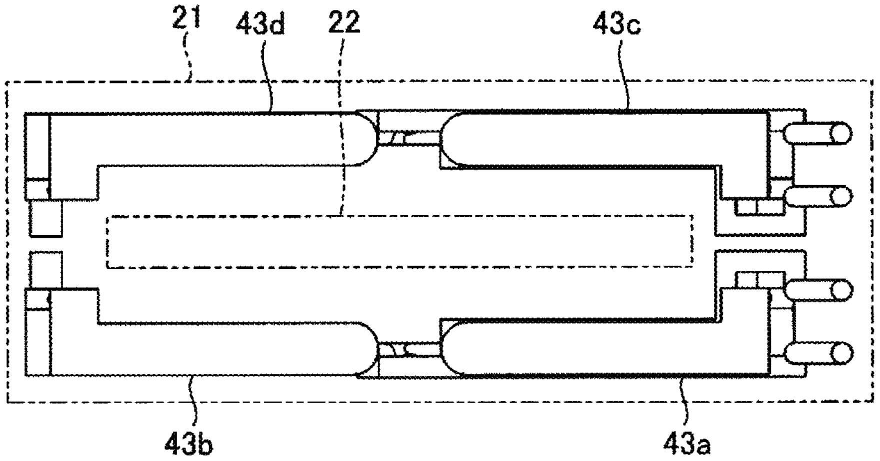
FIG. 13 is an explanatory view of a substrate arrangement.

FIG. 13 is an explanatory view of a substrate arrangement. As illustrated in FIG. 13, the circuit substrate 22 is positioned between the first reservoir set 431 and the second reservoir set 432, as viewed in the third direction Z (plan view) orthogonal to each of the first direction X and the second direction Y.

With the circuit substrate 22 thus positioned between the first reservoir set 431 and the second reservoir set 432, the reservoirs 43*a* to 43*d* are not located directly below the circuit substrate 22, whereby the reservoirs 43*a* to 43*d* are less likely to be affected by heat from the circuit substrate 22. Thus, heat from a source other than the heater 37 (see FIG. 10) is less likely to be transferred to the reservoirs 43*a* to 43*d*. Thus, the temperature of the liquid can be precisely controlled.

Flow Channel Configuration of Supply Member According to Second Embodiment

Figure 14:
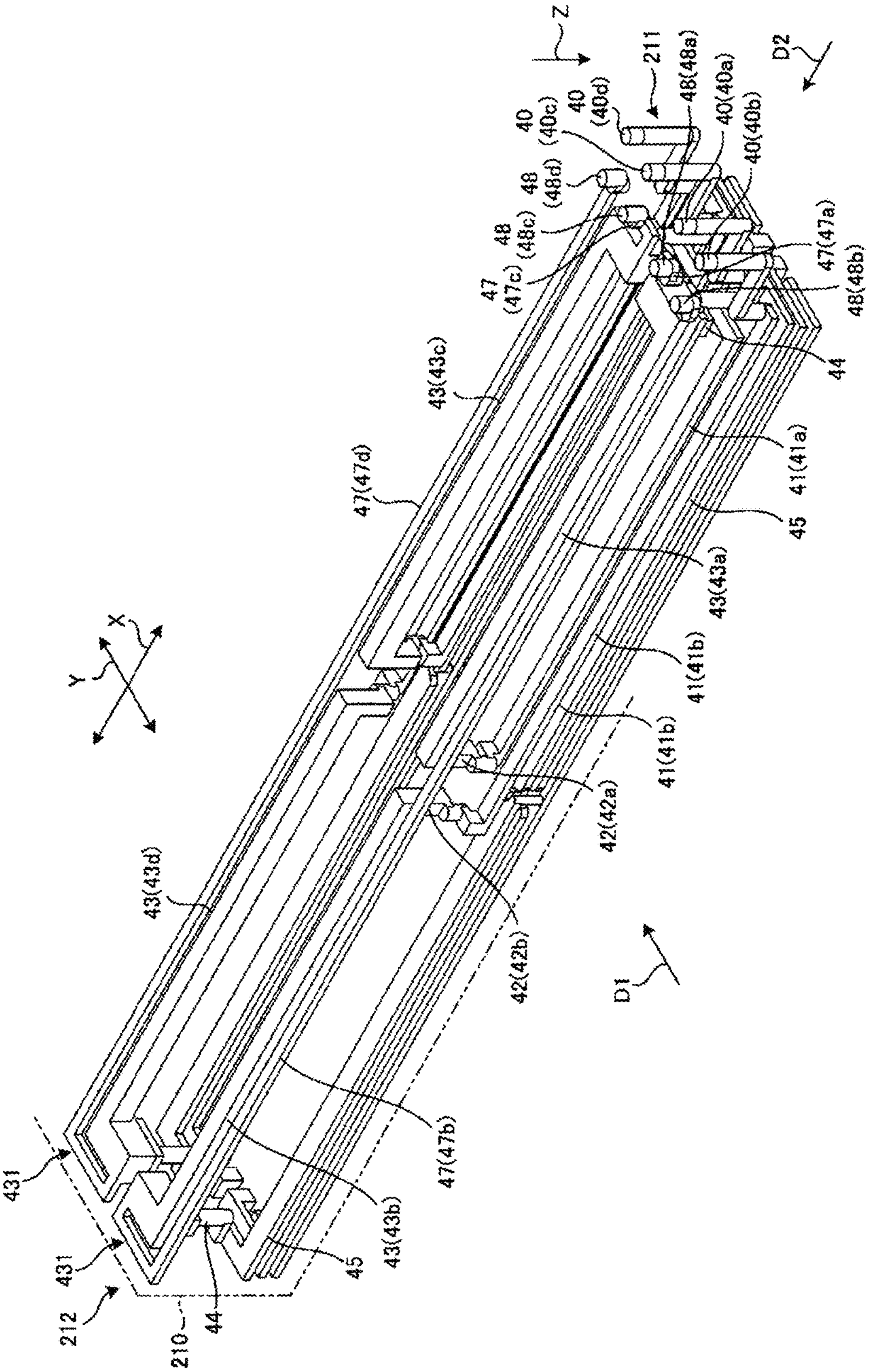
FIG. 14 is a perspective view illustrating a flow channel configuration of a supply member according to a second embodiment.
Figure 15:
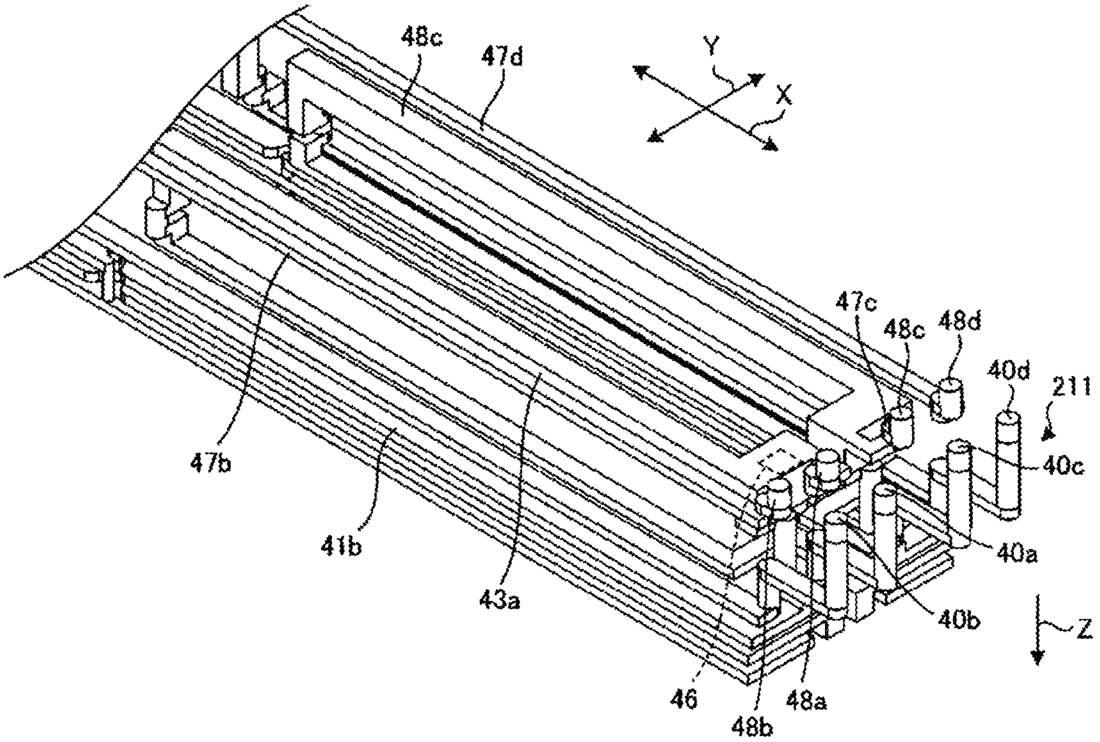
FIG. 15 is an enlarged view of a first end side in FIG. 14.
Figure 16:
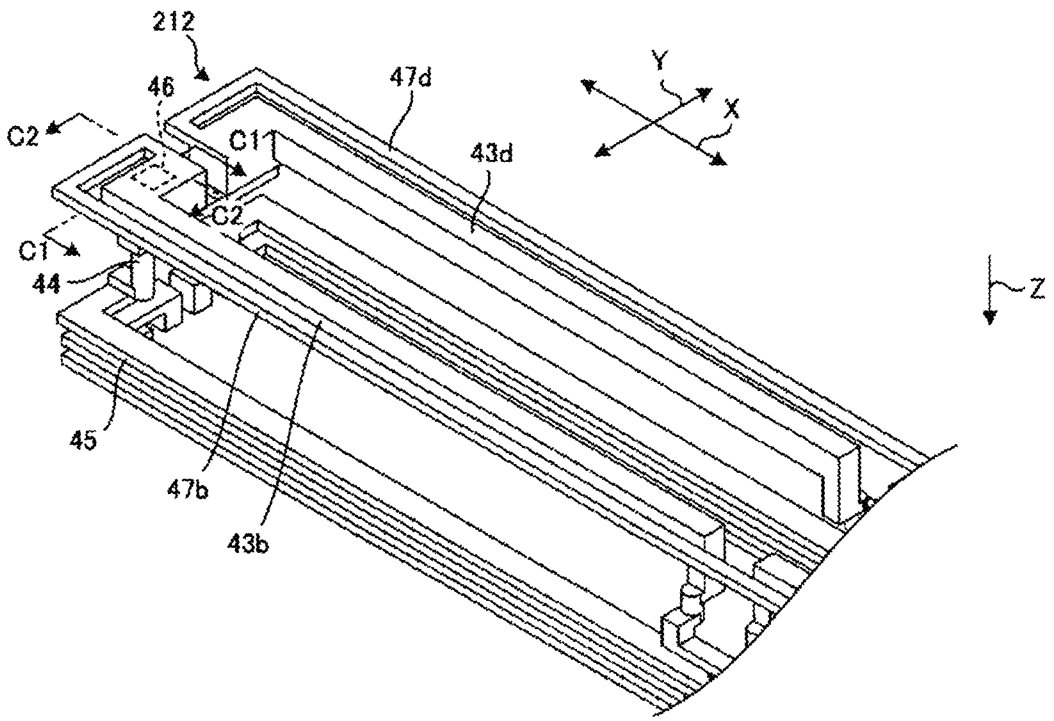
FIG. 16 is an enlarged view of a second end side in FIG. 14.

Next, a configuration of the flow channel of a supply member 210 according to a second embodiment will be described with reference to FIGS. 14 to 20. FIG. 14 is a perspective view illustrating a flow channel configuration of the supply member 210 according to the second embodiment. FIG. 15 is an enlarged view of the first end 211 side in FIG. 14. FIG. 16 is an enlarged view of the second end 212 side in FIG. 14.

Figure 17:
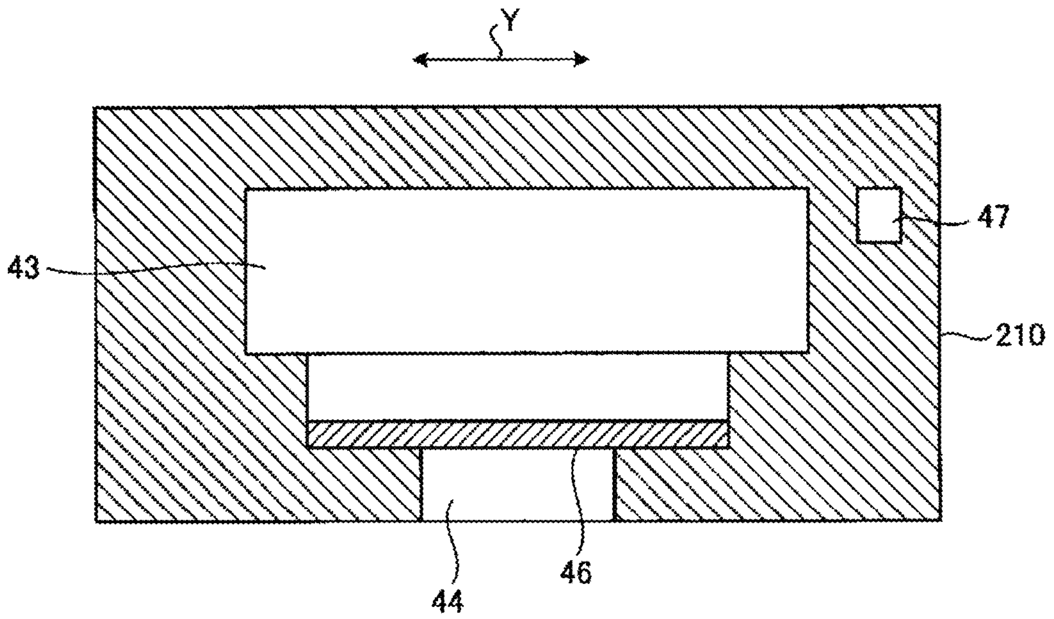
FIG. 17 is a cross-sectional view taken along line C1-C1 in FIG. 16.
Figure 18:
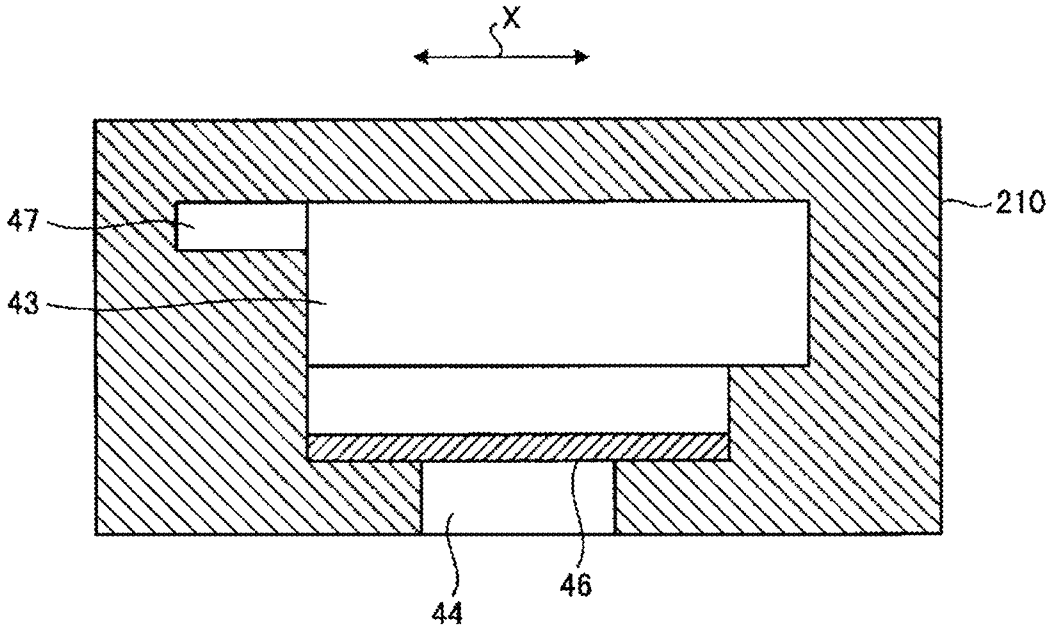
FIG. 18 is a cross-sectional view taken along line C2-C2 in FIG. 16.
Figure 19:
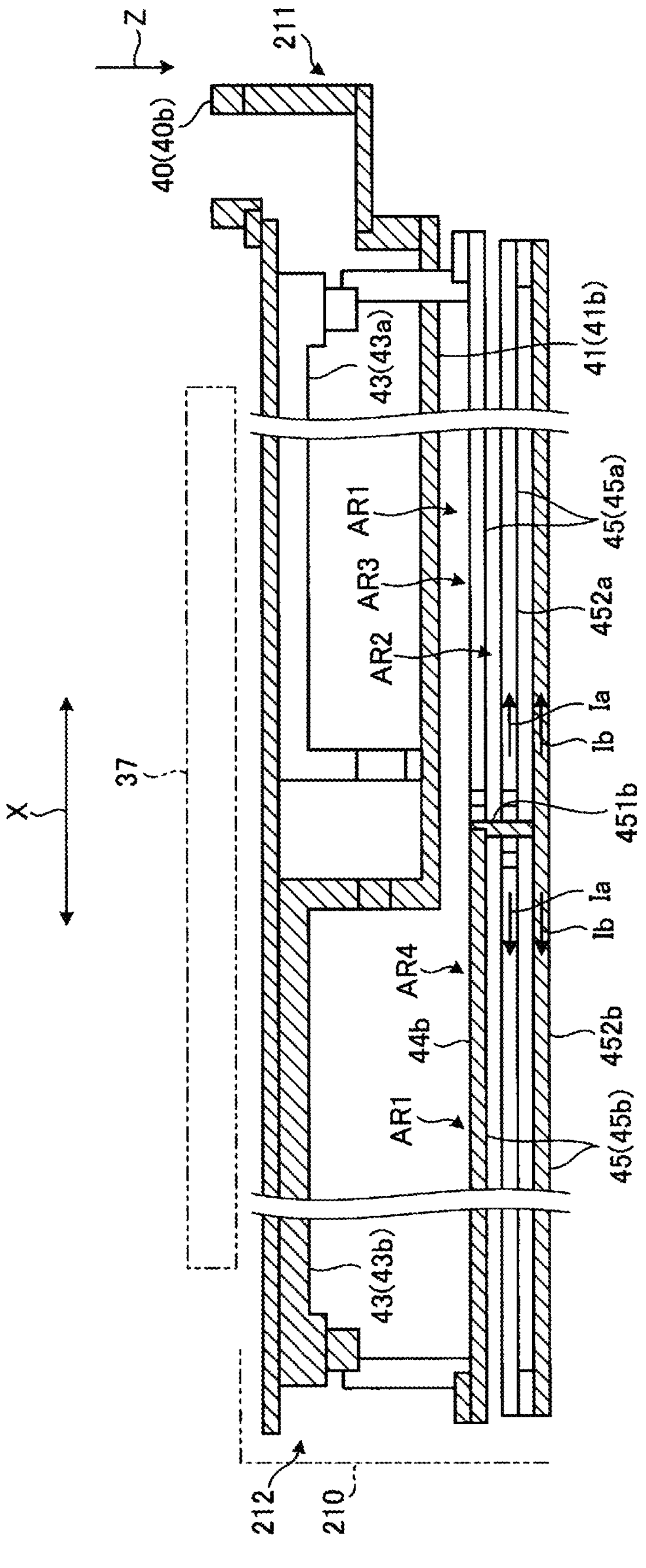
FIG. 19 is a side view as viewed in a D1 direction illustrated in FIG. 14.
Figure 20:
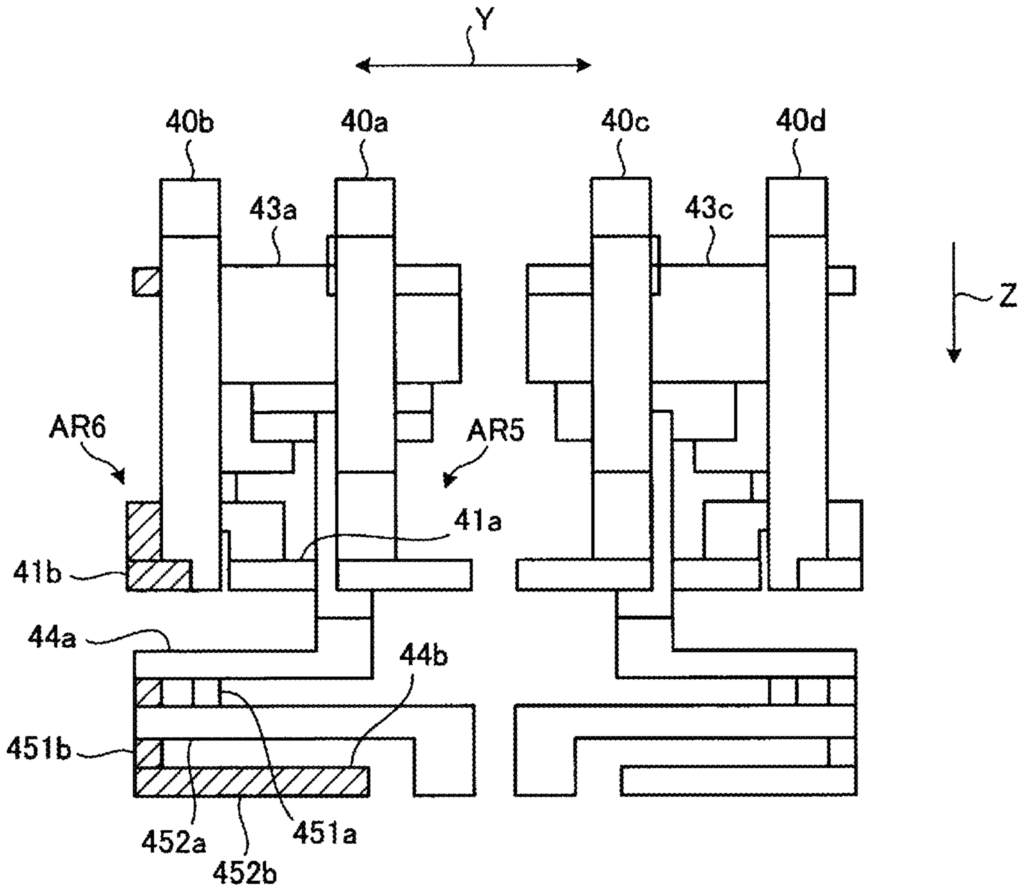
FIG. 20 is a side view as viewed in a D2 direction illustrated in FIG. 14.

FIG. 17 is a cross-sectional view taken along line C1-C1 in FIG. 16. FIG. 18 is a cross-sectional view taken along line C2-C2 in FIG. 16. FIG. 19 is a side view in a D1 direction in FIG. 14. FIG. 20 is a side view in a D2 direction in FIG. 14. Note that FIGS. 13 to 16, FIG. 19, and FIG. 20 illustrate a space to serve as a flow channel.

Note that, in the second embodiment below, redundant explanations are omitted, with parts that are the same as those in the first embodiment described above denoted with the same reference numerals.

The configuration of the supply member 210 according to the second embodiment is primarily different from that of the first embodiment described above in that a discharge flow channel 47 and a discharge port 48 for bubbles are provided. As illustrated in FIG. 14, the supply member 210 includes the discharge flow channel 47 for discharging bubbles from the reservoir 43.

The discharge flow channel 47 is connected to the first surface 24*a* (see FIG. 6) side of the reservoir 43, with respect to the second surface 24*b* (see FIG. 6). The discharge flow channel 47 is connected to the outer side surface of the reservoir 43 in the first direction X.

Of discharge flow channels 47*a* to 47*d*, the discharge flow channels 47*a* and 47*c* protrude from the reservoirs 43*a* and 43*d* toward the first end 211 side along the first direction X, respectively. The discharge flow channels 47*a* and 47*c* are connected to the first end 211 side of the reservoirs 43*a* and 43*c* as viewed in the third direction Z, respectively.

In addition, of the discharge flow channels 47*a* to 47*d*, the discharge flow channels 47*b* and 47*d* protrude from the reservoir 43 toward the second end 212 side along the first direction X, respectively, are bent to extend in the second direction Y, and are further bent to extend in the first direction X toward the first end 211 side.

As illustrated in FIG. 15, discharge ports 48*a* to 48*d* are located at respective first end 211 side, that is, downstream side end portions of the discharge flow channels 47*a* to 47*d*, respectively. In the supply member 210, the supply ports 40*a* to 40*d* and the discharge ports 48*a* to 48*d* are located on the first end 211 side, whereby the interface is concentrated on the first end 211 side.

As illustrated in FIG. 16, the supply member 21 includes the filter 46. As illustrated in FIG. 17, the filter 46 is located between the reservoir 43 (43*c*) and the second connection flow channel 44.

As illustrated in FIG. 18, the discharge flow channel 47 is located at the same level as the surface of the reservoir 43 on the first surface 24*a* side (the upper surface in FIGS. 16 and 17), or is located more on the first surface 24*a* side than the surface on the first surface 24*a* side. Thus, the discharge flow channel 47 is continuous and flush with the upper surface of the reservoir 43. Note that the discharge flow channel 47 may be connected to the upper surface of the reservoir 43 so as to be higher than the upper surface.

The discharge flow channel 47 is located on the filter 46, that is, immediately on the downstream side of the filter 46.

Such a second embodiment provides the same effects as the first embodiment described above, and also provides an additional effect that bubbles in the reservoir 43 can be discharged to the outside through the discharge flow channel 47 for discharging the bubbles.

Furthermore, because the discharge flow channel 47 is connected to the first surface 24*a* side of the reservoir 43, and the discharge flow channel 47 is located at the same level as the surface of the reservoir 43 on the first surface 24*a* side or located more on the first surface 24*a* side than the surface on the first surface 24*a* side, the bubbles in the reservoir 43 are smoothly discharged.

Also, because the discharge flow channel 47 is located immediately on the downstream side of the filter 46, even when bubbles in the reservoir 43 are trapped by the filter 46, such trapped bubbles can be efficiently collected and discharged.

A configuration of a downstream side flow channel of the supply member 21 will be described with reference to FIGS. 19 and 20. Note that, in FIGS. 19 and 20, one of the two reservoirs 43*a* and 43*b* (the reservoir 43*b* and the flow channel around the reservoir 43*b*) is hatched. As illustrated in FIGS. 19 and 20, the supply member 210 includes the first overlapping region AR1 in which the second supply flow channel 45*a* and the second supply flow channel 45*b* overlap, in the flow channel on the downstream side of the reservoir 43.

The supply member 210 includes the second overlapping region AR2 in which the branch flow channel 452*a* and the branch flow channel 452*b* overlap, in the flow channel on the downstream side of the reservoir 43.

In the second overlapping region AR2, the liquid Ia flowing in the branch flow channel 452*a* and the liquid Ib flowing in the branch flow channel 452*b* flow as parallel flows. Although not illustrated in the figures, in the second overlapping region AR2, the liquid Ia flowing in the branch flow channel 452*a* and the liquid Ib flowing in the branch flow channel 452*b* may be configured to flow as counter flows.

The supply member 210 includes the third overlapping region AR3 in which the second connection flow channel 44*a* and the branch flow channel 452*b* overlap, in the flow channel on the downstream side of the reservoir 43*a* located at the first end 211.

The supply member 210 includes the fourth overlapping region AR4 in which the second connection flow channel 44*b* and the branch flow channel 452*a* overlap, in the flow channel on the downstream side of the reservoir 43*b* located at the second end 212.

The supply member 210 includes the fifth overlapping region AR5 in which the first supply flow channel 41*a* connected to the supply port 40*a* and the second connection flow channel 44*b* overlap as illustrated in FIG. 20, in the flow channel on the downstream side of the reservoir 43*a* located at the first end 211.

The supply member 210 includes the sixth overlapping region AR6 in which the first supply flow channel 41*b* connected to the supply port 40*b* and the second connection flow channel 44*a* overlap as illustrated in FIG. 20, in the flow channel on the downstream side of the reservoir 43*b* located at the second end 212.

According to the second embodiment as described above, because the first overlapping region AR1 in which the second supply flow channel 45*a* and the second supply flow channel 45*b* overlap is provided, liquid can exchange heat with another liquid between a plurality of systems (two systems) as in the first embodiment. This contributes to the uniformization of the temperatures of the liquids on the downstream side of the reservoirs 43*a* and 43*b*. As a result, degradation of the discharge performance of the liquid can be suppressed.

Furthermore, because the first overlapping region AR1 in which the second supply flow channel 45*a* and the second supply flow channel 45*b* overlap is provided to contribute to the uniformization of the temperatures of the liquids on the downstream side of the reservoirs 43*a* and 43*b*, the reservoirs 43*a* and 43*b* do not need to overlap each other. As a result, the thickness of the supply member 21 in the third direction Z is less likely to increase.

Furthermore, because the second overlapping region AR2 is provided, liquid can exchange heat with another liquid between a plurality of systems (two systems) as described above to contribute to the uniformization of the liquid temperature.

Because the liquid Ia flowing in the branch flow channel 452*a* and the liquid Ib flowing in the branch flow channel 452*b* flow as parallel flows, the liquid Ia and the liquid Ib flowing in the two branch flow channels 452*a* and 452*b* flow in the same direction while exchanging heat, whereby an attempt to uniformize the temperatures of the liquid Ia and the liquid Ib can be facilitated.

Also in a case where the liquid Ia flowing in the branch flow channel 452*a* and the liquid Ib flowing in the branch flow channel 452*b* flow as counter flows, the liquid Ia and the liquid Ib flowing in the two branch flow channels 452*a* and 452*b* flow while exchanging heat as in the case of the parallel flow, whereby an attempt to uniformize the temperatures of the liquid Ia and the liquid Ib can be facilitated.

Furthermore, because the third overlapping region AR3 is provided, the liquid flowing in the second connection flow channel 44*a* can be pre-heated with the temperature of the liquid flowing in the branch flow channel 452*b*. As a result, an attempt to uniformize the temperatures of the liquids can be facilitated.

Furthermore, because the fourth overlapping region AR4 is provided, the liquid flowing in the second connection flow channel 44*b* can be pre-heated with the temperature of the liquid flowing in the branch flow channel 452*a*. As a result, an attempt to uniformize the temperatures of the liquids can be facilitated.

Furthermore, because the fifth overlapping region AR5 is provided, the liquid flowing in the first supply flow channel 41*a* can be pre-heated with the temperature of the liquid flowing in the second connection flow channel 44*b*, whereby an attempt to uniformize the temperatures of the liquids can be facilitated.

Furthermore, because the sixth overlapping region AR6 is provided, the liquid flowing in the first supply flow channel 41*b* can be pre-heated with the temperature of the liquid flowing in the second connection flow channel 44*a*, whereby an attempt to uniformize the temperatures of the liquids can be facilitated.

The recording apparatus (printer 1) according to the embodiment includes the liquid discharge heads 8, the conveying unit (conveying rollers 6) configured to convey the recording medium (printing sheet P) to the liquid discharge heads 8, and the control unit 14 configured to control the liquid discharge heads 8, as described above. As a result, poor supply of liquid to the reservoir 43 can be prevented. Furthermore, degradation of the discharge performance of the liquid can be suppressed.

In addition, the recording apparatus (printer 1) according to the embodiment includes the liquid discharge heads 8 and the applicator 4 that applies the coating agent on the recording medium (printing sheet P), as described above. Thus, the printing quality of the printer 1 can be improved.

In addition, the recording apparatus (printer 1) according to the embodiment includes the liquid discharge head 8 and the dryer 10 that dries the recording medium (printing sheet P), as described above. With this configuration, it is possible to suppress bonding between the printing sheets P rolled while overlapping each other and rubbing of undried liquid at the collection roller 13.

Additional effects and variations can be readily derived by a person skilled in the art. Thus, the broader aspects of the invention are not limited to the specific details and exemplary embodiments indicated and described above. Accordingly, various changes can be made without departing from the spirit or scope of the general inventive concepts defined by the appended claims and their equivalents.

REFERENCE SIGNS LIST

1 Printer (example of recording apparatus)
4 Applicator
6 Conveying roller (example of conveying unit)
8 Liquid discharge head
10 Dryer
14 Control unit
21 Supply member
211 First end
212 Second end
213 Space
22 Circuit substrate
24 Flow channel member
24*a* First surface
24*b* Second surface
243 Discharge hole
30 Displaced element (example of pressing unit)
40*a* Supply port A
40*b* Supply port B
41 First supply flow channel
41*a* Supply flow channel A
41*b* Supply flow channel B
42 First connection flow channel
42*a* Connection flow channel A
42*b* Connection flow channel B
43 Reservoir
43*a* Reservoir A
43*b* Reservoir B
43*c* Reservoir C
43*d* Reservoir D
44 Second connection flow channel
45 Second supply flow channel
45*a* Second supply flow channel A
45*b* Second supply flow channel B

451*a* Branch portion A
451*b* Branch portion B
452*a* Branch flow channel A
452*b* Branch flow channel B
46 Filter
AR1 First overlapping region
AR2 Second overlapping region
AR3 Third overlapping region
AR4 Fourth overlapping region
AR5 Fifth overlapping region
AR6 Sixth overlapping region
X First direction
Y Second direction
Z Third direction

The invention claimed is:

1. A liquid discharge head, comprising:
a flow channel member comprising:
a first surface;
a second surface located opposite to the first surface, and comprising:
a first end; and
a second end located opposite to the first end in a first direction; and
a plurality of discharge holes located in the second surface;
a pressing unit located on the first surface; and
a supply member connected to the flow channel member, and comprising:
a first supply port;
a first supply flow channel connected to the first supply port;
a first connection flow channel connected to the first supply flow channel; and
a first reservoir comprising a third surface that:
faces toward the first surface;
is elongated in the first direction; and
is connected to the first connection flow channel, wherein the first connection flow channel is located between the first surface and the third surface.

2. The liquid discharge head according to claim 1, wherein the supply member further comprises:
a second supply port;
a second supply flow channel connected to the second supply port;
a second connection flow channel connected to the second supply flow channel; and
a second reservoir comprising a fourth surface that:
faces toward the first surface;
is elongated in the first direction; and
is connected to the second connection flow channel, wherein the second connection flow channel is located between the first surface and the fourth surface, and
each of the first supply port and the second supply port is adjacent to the first end.

3. The liquid discharge head according to claim 2, wherein
the first reservoir is adjacent to the first end,
the third surface of the first reservoir comprises:
a third end; and
a fourth end opposite to the third end in the first direction and between the second end and the third end in the first direction, wherein the first connection flow channel is connected to the fourth end,
the second reservoir is adjacent to the second end, and
the first supply flow channel comprises a portion extending in a second direction different from the first direction; and
connected to the first connection flow channel.

4. The liquid discharge head according to claim 3, wherein
the fourth surface of the second reservoir comprises:
a fifth end; and
a sixth end opposite to the fifth end in the first direction and between the second end and the fifth end in the first direction,
the second connection flow channel is connected to the fifth end, and
the second supply flow channel extends in the first direction.

5. The liquid discharge head according to claim 2, wherein
the supply member further comprises:
a third supply port;
a third supply flow channel connected to the third supply port;
a third connection flow channel connected to the third supply flow channel;
a third reservoir connected to the third connection flow channel;
a fourth supply port;
a fourth supply flow channel connected to the fourth supply port;
a fourth connection flow channel connected to the fourth supply flow channel; and
a fourth reservoir connected to the fourth connection flow channel,
the first reservoir and the second reservoir are on a first straight line in the first direction,
the third reservoir and the fourth reservoir are on a second strait line in the first direction,
the first straight line is apart from the second straight line, and
a space surrounded by the first, second, third and fourth reservoirs is a through hole in a third direction perpendicular to the first surface.

6. The liquid discharge head according to claim 5, wherein the space is above the pressing unit.

7. The liquid discharge head according to claim 5 further comprising a circuit substrate in the space.

8. The liquid discharge head according to claim 1, wherein the supply member further comprises:
a second connection flow channel connected to the third surface; and
a second supply flow channel connected to the second connection flow channel.

9. The liquid discharge head according to claim 8, wherein
the supply member further comprises a filter, and
the filter is located between the second connection flow channel and the first reservoir.

10. The liquid discharge head according to claim 1, wherein
the supply member further comprises a discharge flow channel configured to discharge bubbles from the reservoir, and
the discharge flow channel is connected to the reservoir.

11. The liquid discharge head according to claim 10, wherein the discharge flow channel is connected to the third surface.

12. The liquid discharge head according to claim 11, wherein the supply member extends in the first direction, the first reservoir further comprises:

a third end; and a fourth end opposite to the third end and closer to the second end than the third end, the supply member further comprises a filter at or adjacent to the third end, and the discharge flow channel is connected to the third end.

13. A recording apparatus, comprising:

the liquid discharge head according to claim 1;

a conveying unit configured to convey a recording medium to the liquid discharge head; and a control unit configured to control the liquid discharge head.

14. A recording apparatus, comprising:

the liquid discharge head according to claim 1; and an applicator configured to apply a coating agent onto a recording medium.

15. A recording apparatus, comprising:

the liquid discharge head according to claim 1; and a dryer configured to dry a recording medium.

16. The liquid discharge head according to claim 1, wherein the supply member is elongated in the first direction, and the supply member further comprises a second reservoir located on a same plane as the first reservoir and adjacent to the first reservoir in the first direction.

17. The liquid discharge head according to claim 16, wherein the supply member further comprises a third reservoir and a fourth reservoir adjacent to the third reservoir in the first direction, the third and fourth reservoirs are located on the same plane as the first and second reservoirs, and the third and fourth reservoirs are opposite to the first and second reservoirs in a second direction perpendicular to the first direction.

18. A liquid discharge head, comprising:

a flow channel member comprising:

a first surface;

a second surface located opposite to the first surface, and comprising:

a first end; and a second end located opposite to the first end in a first direction; and a plurality of discharge holes located in the second surface;

a pressing unit located on the first surface; and a supply member connected to the flow channel member, and comprising:

a first supply port;

a first supply flow channel connected to the first supply port, the first supply flow channel is elongated in the first direction;

a first connection flow channel connected to the first supply flow channel; and a first reservoir connected to the first connection flow channel, the first reservoir is elongated in the first direction.

* * * * *